(12) United States Patent
Oogami et al.

(10) Patent No.: US 7,648,538 B2
(45) Date of Patent: Jan. 19, 2010

(54) BATTERY

(75) Inventors: Etsuo Oogami, Atsugi (JP); Ryuichi Amagai, Isehara (JP); Takeshi Shimizu, Yokohama (JP); Satoru Kouda, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 855 days.

(21) Appl. No.: 10/959,299

(22) Filed: Oct. 7, 2004

(65) Prior Publication Data

US 2005/0089751 A1   Apr. 28, 2005

(30) Foreign Application Priority Data

Oct. 10, 2003   (JP)   ............... 2003-351710

(51) Int. Cl.
*H01M 4/82* (2006.01)
*H01M 6/12* (2006.01)
*H01M 2/00* (2006.01)
*H01M 2/10* (2006.01)

(52) U.S. Cl. .............. 29/623.4; 429/163; 429/162; 429/186

(58) Field of Classification Search .......... 429/162, 429/163, 186; 29/623.4
See application file for complete search history.

(56) References Cited

U.S. PATENT DOCUMENTS

| 3,844,841 | A | 10/1974 | Baker |
| 4,507,856 | A | 4/1985 | Pearson |
| 5,227,260 | A * | 7/1993 | Rose et al. ............ 429/54 |
| 5,487,958 | A | 1/1996 | Tura |
| 7,198,866 | B2 * | 4/2007 | Miyamoto et al. ....... 429/149 |
| 2001/0031392 | A1 | 10/2001 | Ogata et al. |
| 2003/0017387 | A1 | 1/2003 | Marukawa et al. |
| 2003/0118898 | A1 * | 6/2003 | Kimura et al. .......... 429/156 |

FOREIGN PATENT DOCUMENTS

| CN | 1277462 A | 12/2000 |
| EP | 1 059 682 B1 | 8/2002 |
| JP | 7-183022 A | 7/1995 |
| JP | 10-255734 A | 9/1998 |
| JP | 2000-195480 A | 7/2000 |
| JP | 2003-59486 A | 2/2003 |
| JP | 2003-197166 A | 7/2003 |

* cited by examiner

*Primary Examiner*—Patrick Ryan
*Assistant Examiner*—Helen O Chu
(74) *Attorney, Agent, or Firm*—Foley & Lardner LLP

(57) ABSTRACT

Unit cells are held in a plate frame to form a cell module. A plurality of the cell modules is laminated in a thickness direction of the frame to form a laminated structure of unit cells. The cell unit is pressurized with heat sinks from both sides in the direction of the lamination, and is integrally held to form a battery.

18 Claims, 28 Drawing Sheets

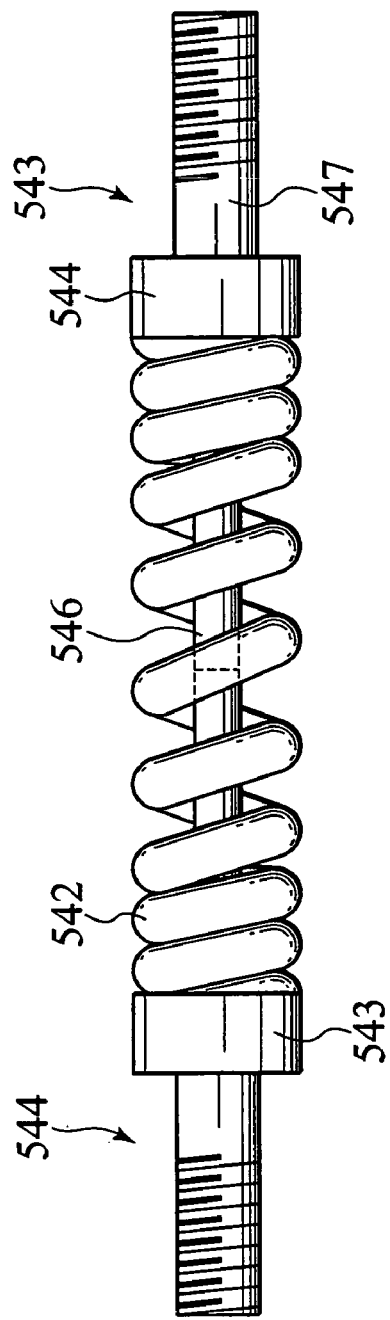
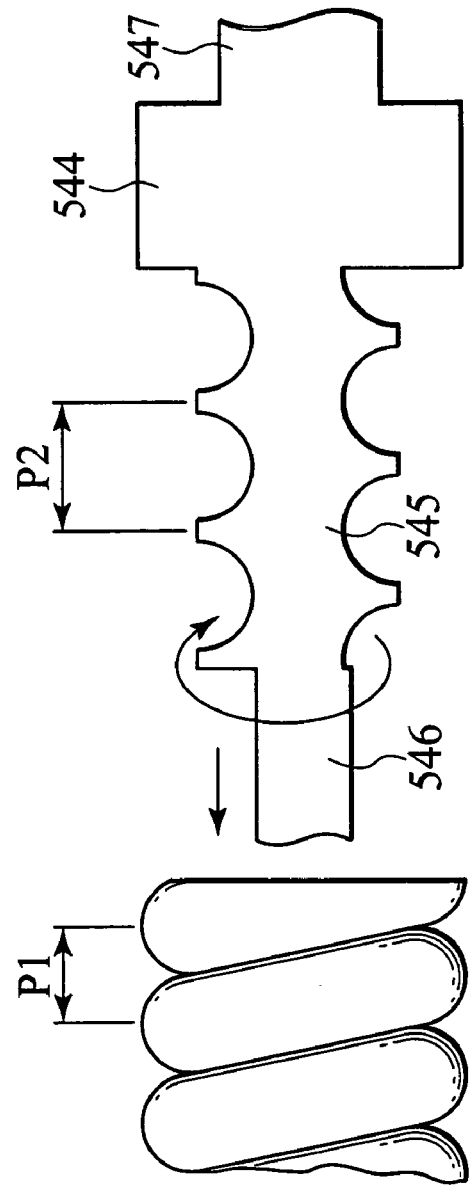
FIG.12A
FIG.12B

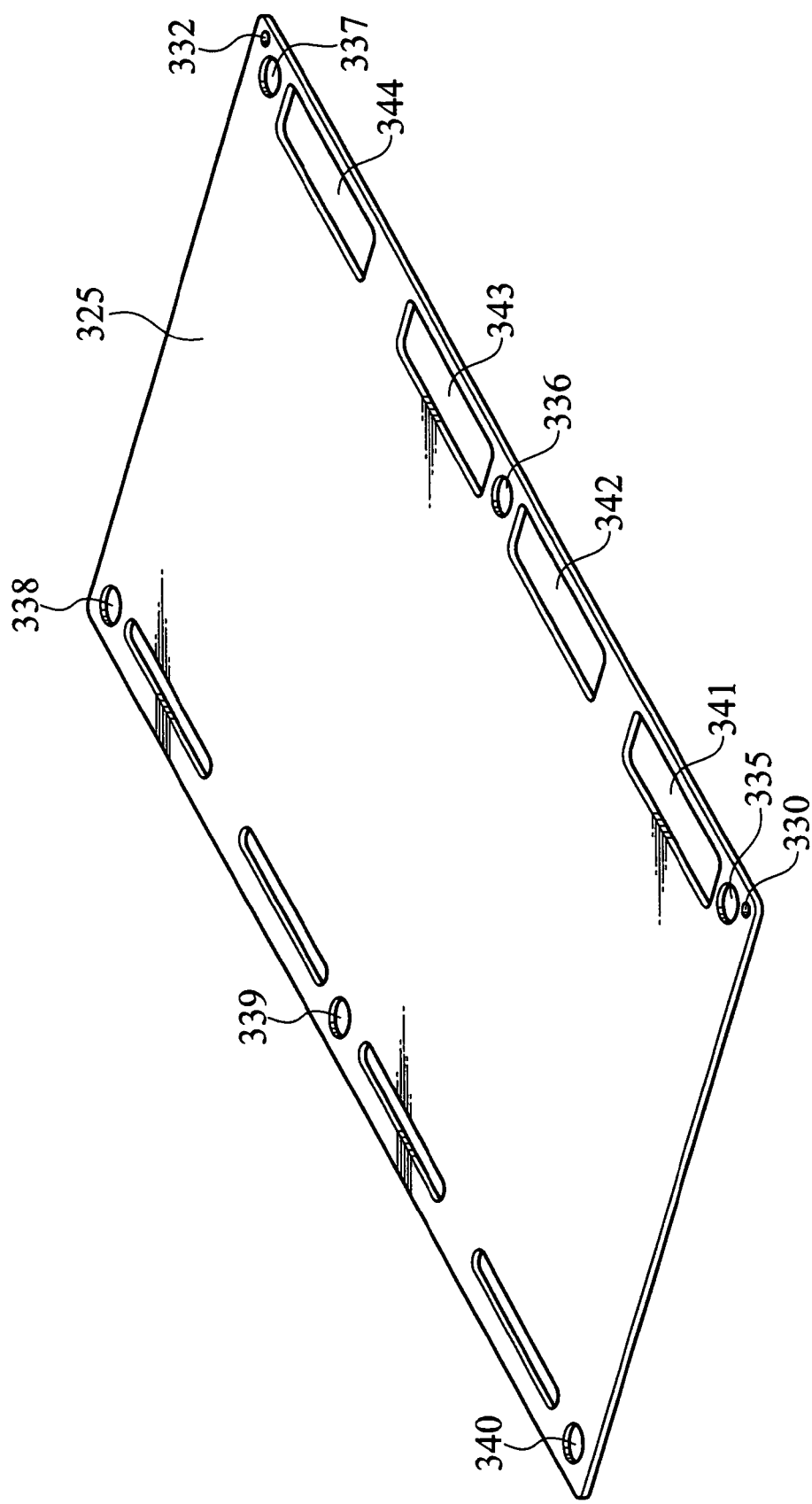

BATTERY

BACKGROUND OF THE INVENTION

The present invention relates to a battery that has an optimum configuration as a power source to supply large energy in high energy density in a small size with lightweight.

In recent years, there is a tendency of shifting a power source of an automobile from an engine that uses a fossil fuel to a motor that uses electric energy based on increased environmental consciousness. For this reason, technologies of battery as the power source of the motor are developed rapidly.

An automobile is desirably equipped with a compact and lightweight battery that can be frequently charged with and can discharge large power, with excellent shock resistance and heat dissipation. A battery with excellent heat dissipation that can supply large power is disclosed in Japanese Patent Publication No. 2000-195480, for example.

The battery disclosed in this literature (particularly in paragraphs [0014] to [0029] and FIGS. 1, 2, and 4) has the following configuration. A plurality of flat unit cells that are electrically connected in series, in parallel, or in series parallel, are disposed in a thickness direction of the unit cells with a certain distance between the cells. A pressing member is disposed between the unit cells to press the cells at both sides, and an external member fixes the unit cells. Based on this configuration, the unit cells can satisfactorily dissipate heat to improve the cycle life and discharge characteristics of the battery.

SUMMARY OF THE INVENTION

Since the battery in the above literature uses a flat unit cell as an unit cell, this battery has higher energy density than that of a conventional battery using cells other than the flat unit cells. A compact unit cell can be manufactured for the same power capacity. Therefore, the battery using the flat unit cells is suitable for the cell to be installed on an automobile from the viewpoint of compactness and high energy density.

However, because the battery is developed for a storage system, this battery requires a large improvement in its configuration to be applicable to an automobile that must satisfy high production efficiency, compactness and lightweight, shock resistance, and high reliability.

Specifically, a configuration of the battery that can improve the production efficiency needs to be considered, and the battery requires various kinds of improvement. For example, to obtain compactness and lightweight, unit cells using a minimum number of parts must be arranged into a battery to obtain maximum capacity-efficiency. A frequent charging and discharging of the cells must not cause a capacity reduction and life reduction due to gas that is generated within the unit cells. The battery needs to have shock resistance to ensure stable operation despite exposure to vibration at all the times. When arranged in extremely high density, unit cells need to achieve efficient heat dissipation.

According to the present invention, a battery that has an optimum configuration as a power source to supply large energy in high energy density in a small size with lightweight can be provided.

According to a technical aspect of the present invention, a battery has a laminated structure of cell modules in which each cell module includes one or a plurality of flat unit cells being electrically connected to each other.

According to another technical aspect of the invention, a method of manufacturing a battery includes the step of forming a cell module including a plurality of flat unit cells, and a step of forming a laminated structure of cell modules in which the flat cells are electrically connected to each other.

BRIEF DESCRIPTION OF THE DRAWINGS

FIGS. 12A and 12B are detailed configurational diagrams of the pressurizing unit;

FIG. 14 is a perspective diagram of a configuration of an intermediate heat sink;

DESCRIPTION OF THE PREFERRED EMBODIMENTS

A battery according to a first embodiment to a third embodiment of the present invention will be explained in detail below. In the first embodiment, a configuration and a manufacturing procedure of a battery will be explained.

First Embodiment

The battery according to the present embodiment has the following configuration. Four flat unit cells (hereinafter referred to as unit cells) are arranged on a frame in the width direction. Twenty-four frames are laminated to constitute an unit structure of battery. The battery unit is pressed with heat sinks from both sides of the unit in the lamination direction, and is integrally held with pressure. Thus, the battery unit has ninety six unit cells in total. All the unit cells are connected in series with electric connecting units that are provided on the frames and the heat sinks. Specifically, four laminations of unit cells are connected in series with the electric connecting units, each lamination having twenty four unit cells connected in series in the lamination direction.

Configuration of the Battery

Figure 1:
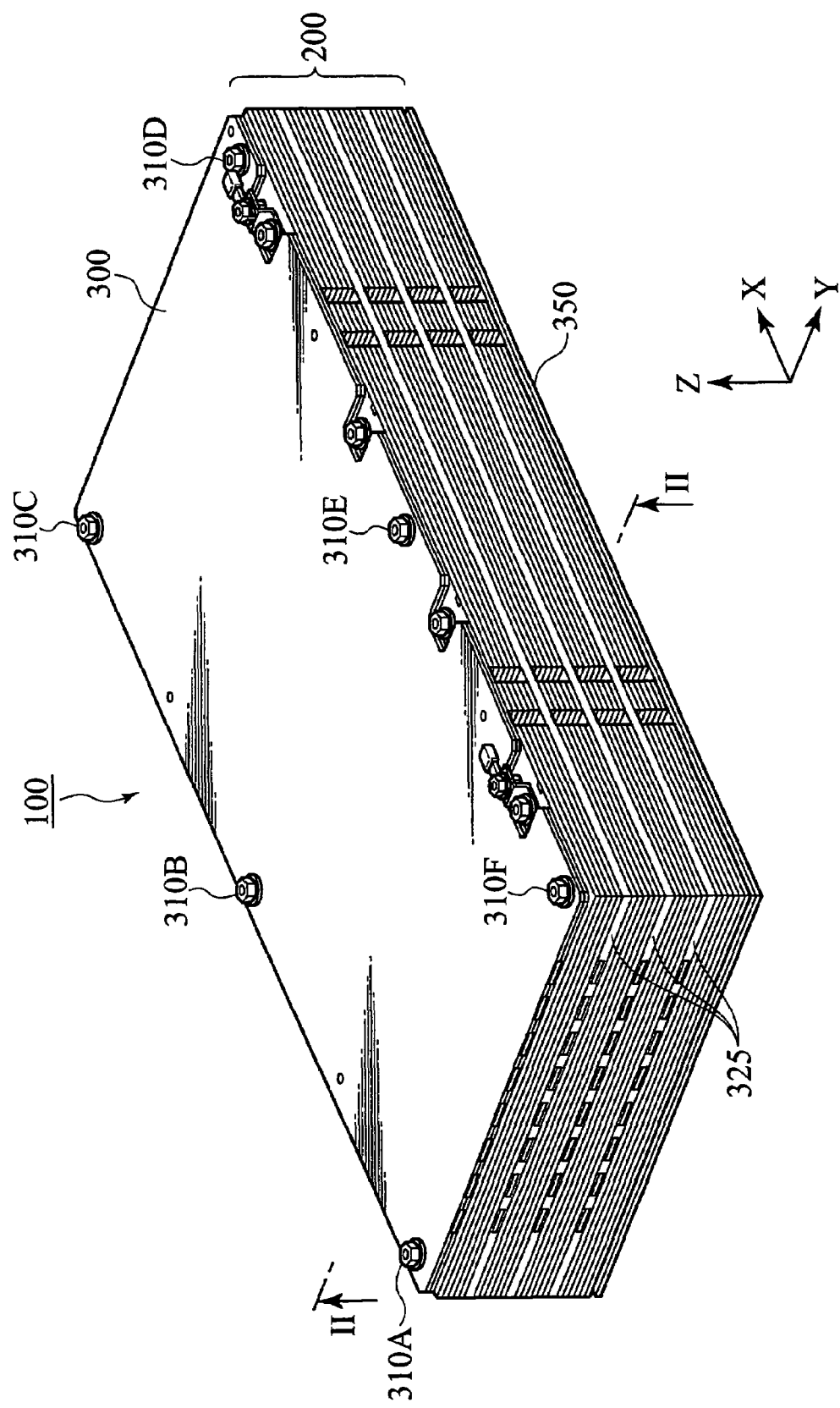
FIG. 1 is a perspective diagram of an appearance of a battery according to a first embodiment of the present invention.
Figure 2:
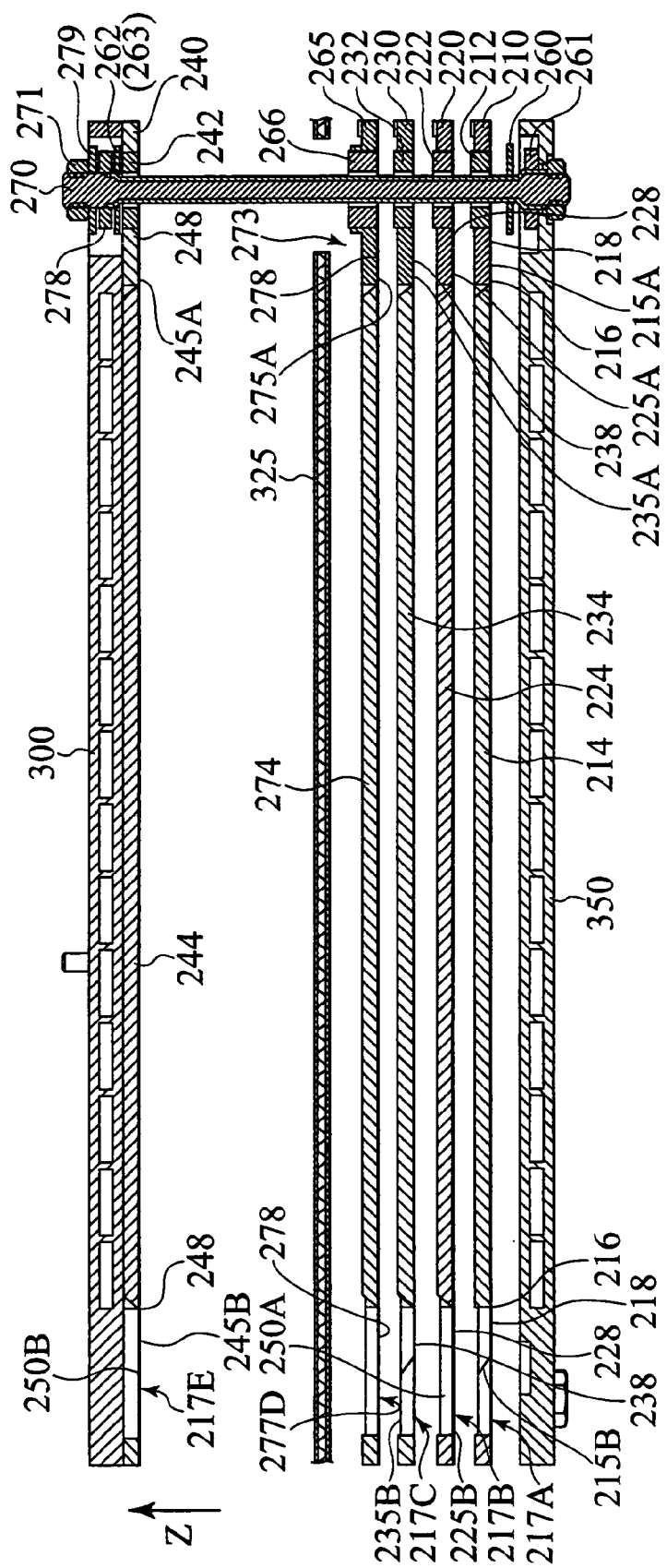
FIG. 2 is a schematic partial cross sectional diagram of the battery shown in FIG. 1 cut along a line II-II in FIG. 1, showing a lamination state of main constituent elements.
Figure 3:
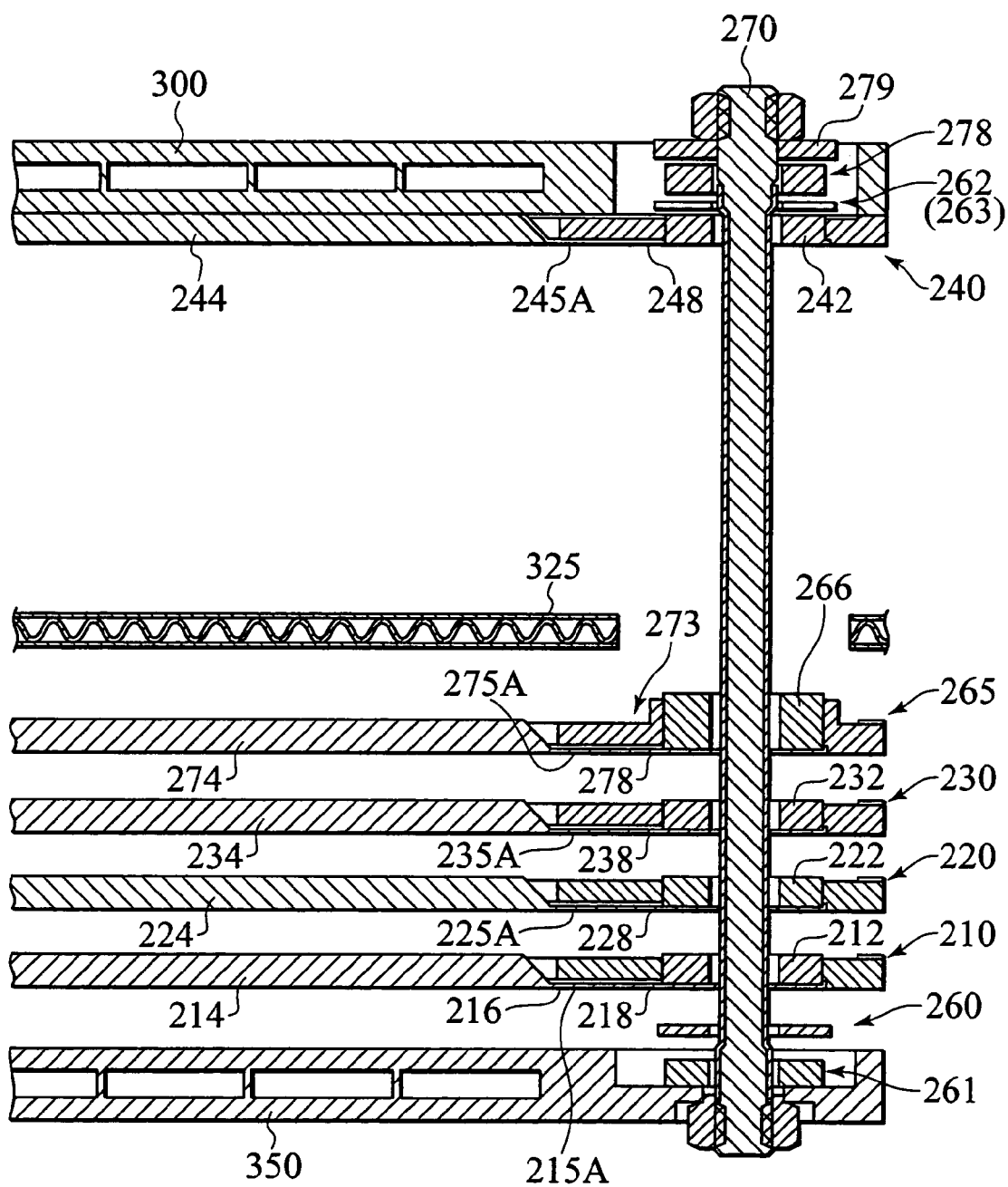
FIG. 3 is a partly enlarged cross sectional diagram of a portion shown in FIG. 2.
Figure 4:
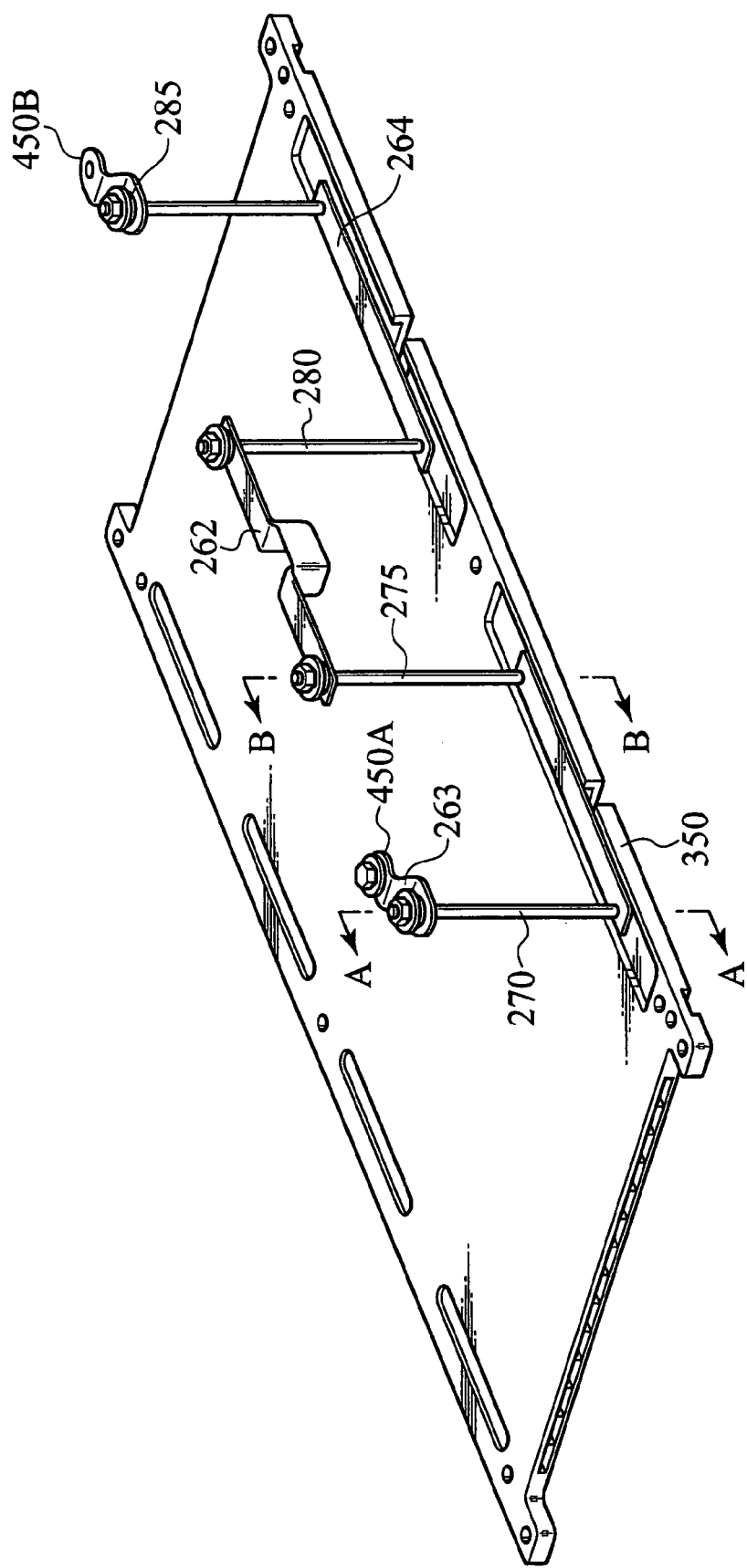
FIG. 4 is a diagram showing a relationship of a connection between a bus bar and a through bolt of the battery shown in FIG. 1.
Figure 5:
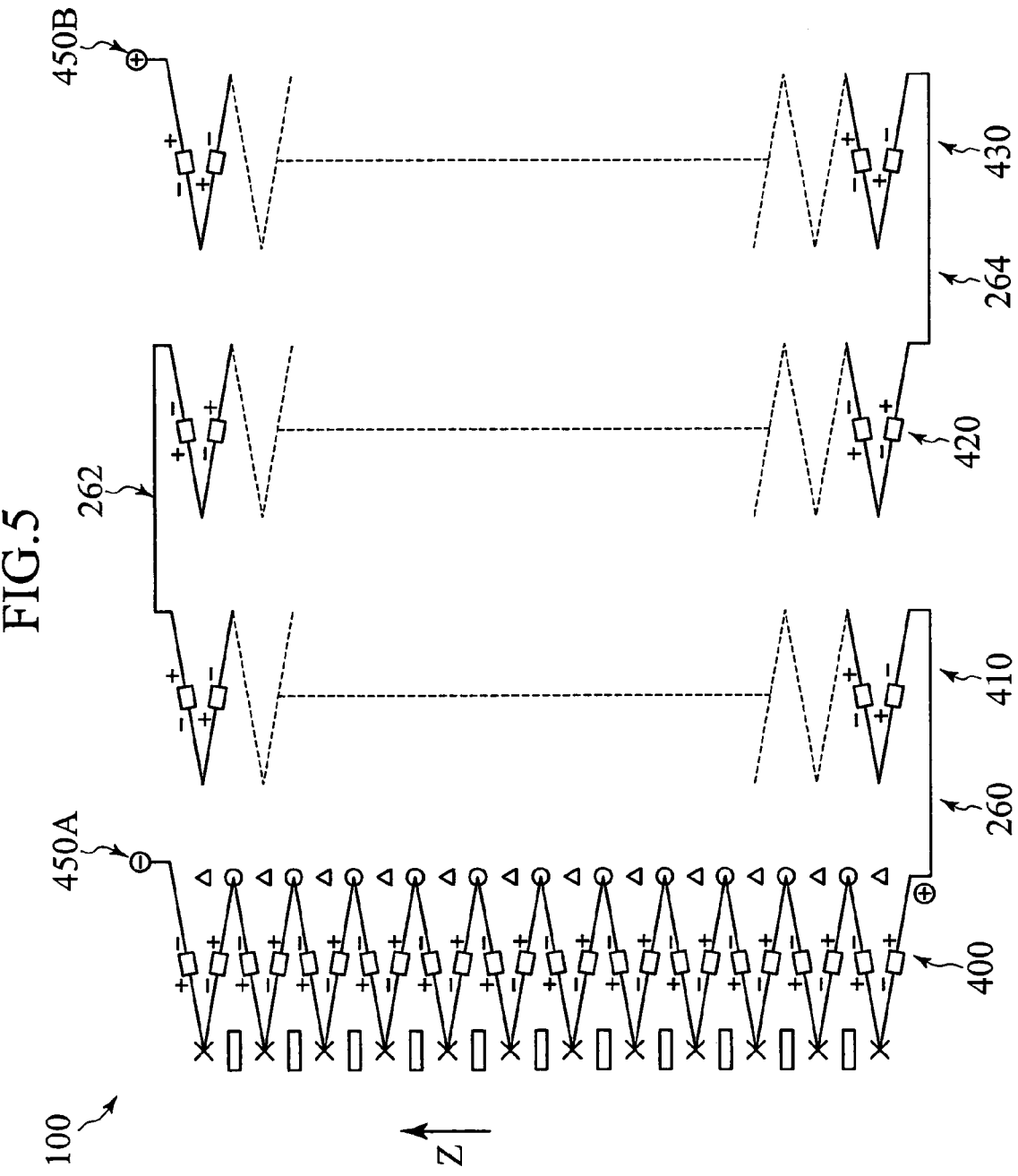
FIG. 5 is a schematic diagram showing a state of a connection between unit cells that constitute the battery shown in FIG. 1.

The configuration and the manufacturing procedure of the battery will be explained in detail with reference to the drawings. FIG. 1 is a perspective diagram of an appearance of the battery according to the present invention. FIG. 2 is a schematic partial cross sectional diagram of the battery shown in FIG. 1 cut along a line II-II in FIG. 1, showing a lamination state of main constituent elements. FIG. 3 is a partly enlarged cross sectional diagram of a portion shown in FIG. 2. FIG. 4 is a diagram showing a relationship of a connection between a bus bar and a through bolt of the battery shown in FIG. 1. FIG. 5 is a schematic diagram showing a state of a connection between unit cells that constitute the battery shown in FIG. 1.

As shown in FIG. 1, a battery 100 according to the present invention has the following configuration. Heat sinks 300 and 350 as holders press unit cells 200 from both sides thereof in the lamination direction, thereby integrally holding the unit cells (the laminated structure of unit cell) 200 with pressure. The unit cells 200 include a plurality of plate frames laminated in the thickness direction (i.e., Z direction) of the frames.

The frame, not shown, has four holders 219 each of which holds a flat unit cell on the same plane in parallel (in the X-Y direction). In a battery 100, twenty-four frames are laminated in a direction intersecting the virtual plane X-Y (i.e., in the Z direction). An intermediate heat sink 325 is inserted into between the frames at every sixth frame in the lamination direction. Therefore, the battery 100 has a lamination of twenty-four frames, each frame having four unit cells laid out in parallel, and has ninety-six unit cells in total.

The heat sinks 300 and 350 are fixed with six pressurizing units that combine both heat sinks. The pressurizing units are fitted with nuts 310A to 310F. Each pressurizing unit has shafts fixed with the nuts 310A to 310F at both ends of a tension coil spring. By fitting the pressurizing units between the heat sinks 300 and 350, suitable surface pressure is applied in a lamination direction to all the unit cells that constitute the laminated structure of unit cell 200.

The battery 100 has a laminated structure as shown in FIG. 2 and FIG. 3. These drawings are simplified to facilitate the understanding of the invention. While only four frames are provided between the heat sink 350 and the intermediate heat sink 325 in these drawings, six frames are provided in actual practice.

An insulation washer 212 as an insulator is embedded into one end of a frame 210 (i.e., an insulation washer embedded frame) that constitutes a cell module 180. A peripheral supporter 218 that supports a periphery 216 of a unit cell 214 is formed around the frame 210. A center portion of the frame 210 surrounded by the peripheral supporter 218 of the frame 210 is opened. Elements that are adjacent in the lamination direction (i.e., the heat sink 350 and an unit cell 224) are in direct contact with the external surface of the unit call 214. At the other end of the frame 210, an opening 217A is formed to provide an ultrasonic welding between an electrode tab 215D of the unit cell 214 and an electrode tab 225B of the unit cell 224 that is positioned adjacent to each other in the lamination direction. The electrode tab 215A of the unit cell 214 is in contact with the insulation washer 212 and a bus bar 260 described later. The insulation washer 212 is thicker the frame 210, and is thinner than the unit cell 214. In other words, the insulation washer 212 has a thickness between that of the frame 210 and that of the unit cell 214. All the insulation washer embedded frames that constitute the battery 100 use insulation washers each having a thickness in the same manner.

A conductive washer 222 as a conductor is embedded into one end of a frame 220 (i.e., a conductive washer embedded frame). A peripheral supporter 228 similar to that of the frame 210 is formed around the frame 220. A center portion of the frame 220 surrounded by the peripheral supporter 228 is opened. An opening 217B similar to that of the frame 210 is formed at the other end of the frame 220. One electrode tab 225A of the unit cell 224 is in contact with the conductive washer 222, and is connected to an electrode tab 235A of an unit cell 234 via the conductive washer 222. The conductive washer 222 is thicker than the frame 220, and is thinner than the unit cell 224. In other words, the conductive washer 222 has a thickness between that of the frame 220 and that of the unit cell 224. Based on this thickness relationship, the electrode tab 225A can be contacted with the conductive washer 222 while applying a desired surface pressure to the unit cell 224. All the conductive washer embedded frames constituting the battery 100 use conductive washers each having a thickness in the same manner.

The electrode tab 215B of the unit cell 214 positioned and supported by the frame 210 and the electrode tab 225B of the unit cell 224 positioned and supported by the frame 220 are pressurized from both sides of the openings 217A and 217S formed on the respective frames and are provided with an ultrasonic welding with a tool not shown.

An insulation washer 232 is embedded into one end of a frame 230 (i.e., an insulation washer embedded frame). A peripheral supporter 238 similar to that of the frame 210 is formed around the frame 230. A center portion of the frame 230 surrounded by the peripheral supporter 238 is opened. An opening 217C similar to that of the frame 210 is formed at the other end of the frame 230. One electrode tab 235A of the unit cell 234 is in contact with the insulation washer 232 and the conductive washer 222. When the frame 220 and the frame 230 are laminated, the electrode tab 235B of the unit cell 234 is brought into contact with the welded electrode tabs 215B and 225B at the lower side because of the presence of the opening 217C. Therefore, to avoid this contact, an insulation tape 250A is adhered to the upper side of the electrode tab 225B.

A conductive washer 266 is embedded into one end of a frame 265 (i.e., a conductive washer embedded frame), and a mounting portion 273 is formed in an intermediate heat sink 325 to be laminated on the frame 265. A peripheral supporter 278 similar to that of the frame 210 is formed around the frame 265. A center portion of the frame 265 surrounded by the peripheral supporter 278 is opened. An opening 277D similar to that of the frame 210 is formed at the other end of the frame 265. One electrode tab 275A of the unit cell 274 is in contact with the conductive washer 266. The conductive washer 266 has a thickness equal to a summation of the thickness of the insulation washer or the conductive washer and that of the intermediate heat sink 325. The thickness of the insulation washer is the same as that of the conductive washer.

While only four frames are interposed between the heat sink 350 and the intermediate heat sink 325 in FIG. 2 and FIG. 3, six frames are actually laminated between the heat sink 350 and the intermediate heat sink 325, in the order of an insulation washer embedded frame, a conductive washer embedded frame, an insulation washer embedded frame, a conductive washer embedded frame, an insulation washer embedded frame, and a conductive washer embedded frame, from the bottom layer.

The intermediate heat sink 325 is mounted on the mounting portion 273 of the frame 265. The frame 265 insulates the intermediate heat sink 325 from the conductive washer 266.

Six frames, an intermediate heat sink, six frames, an intermediate heat sink, six frames, and the heat sink 300 are further laminated in this order on the intermediate heat sink 325. The fame 240 immediately below the heat sink 300 has a configuration similar to that of the frame 220. In other words, a conductive washer 242 is embedded into one end of the frame 240. A peripheral supporter 248 similar to that of the frame 210 is formed around the frame 240. A center portion of the frame 240 surrounded by the peripheral supporter 248 is opened. An opening 217E similar to that of the frame 210 is formed at the other end of the frame 240. One electrode tab 245A of the unit cell 244 is in contact with the conductive washer 242. Although not shown in the drawings, the electrode tab 245B of the unit cell 244 is ultrasonically welded with the electrode tab of the unit cell positioned therebelow. An insulation tape 250B is adhered to the upper side of the electrode tab 245B to insulate the electrode tab 245B from the heat sink 300.

All the laminated frames are fixed with a through bolt 270 and a nut 271 fixed with the bolt. An insulation washer 278 and a washer 279 are interposed between the nut 271 and the conductive washer 242. The insulation washer 278 is used to insulate a bus bar 262. The washer 279 is used to prevent the insulation washer 278 from braking, because the insulation washer 278 is made of ceramic.

The bus bar 260 is provided on the heat sink 350 to electrically connect the laminated unit cell to a unit cell that is adjacent to the unit cell in the array direction. An insulation washer 261 insulates the bus bar 260 from the heat sink 350. The through bolt 270 of which surrounding is insulated is mechanically connected to the bus bar 260. Bus bars 260, 262, and 264 present in the battery 100 are linked with through bolts 270, 275, 280, and 285, as shown in FIG. 4. The through bolts 270, 275, 280, and 285 are erected on the bottom surface of the heat sink 350. The through bolts 270, 275, 280, and 285 connect the laminated unit cells in series by using the bus bars 260, 262, and 264.

When FIG. 2 and FIG. 3 are representative of cross sectional diagrams of the configuration in FIG. 4 cut along a line A-A, the reference numeral 262 denotes a member 263 connected to a power terminal 450A. When FIG. 2 and FIG. 3 are cross sectional diagrams of the configuration in FIG. 4 out along a line B-B, the reference numeral 262 denotes bus bars.

When the heat sinks 300 and 350 are fixed with the bolts and the nuts 310A to 310F in the state of the cell unit 200 interposed, and when the four through bolts are fastened with four connecting terminals, the unit cells that constitute the battery 100 are connected in series in the lamination direction (i.e., the z direction) as shown in FIG. 5.

The battery 100 has four rows of laminated structure of unit cells, each row having a laminated structure with a connection of twenty four unit cells. In other words, as shown in FIG. 5, in each of the laminated structure 400, 410, 420, and 430, all the unit cells are electrically connected in series in the lamination direction. More specifically, unit cells on one side of the laminated structure 400 are electrically connected each other (as depicted by ? marks on left side of the laminated structure 400 in FIG. 5) by ultrasonic welding. The connected portions of these unit cells are insulated from each other (at square portions in FIG. 5) with an insulation tape (as shown by 250A and 250B in FIG. 2, for example). On the other hand, unit cells on the other side of the laminated structure 400 are electrically connected (as depicted by ○ marks in FIG. 5) with a conductive washer (as depicted by 222 and 266 in FIG. 2., for example). The connected portions of unit cells are insulated from each other (as depicted by triangles in FIG. 5) with an insulation washer. Therefore, when the battery 100 is assembled, all the unit cells that constitute the laminated structure of unit cells 400 are connected in series. Other laminated structures of unit cells 410, 420, and 430 have also all the unit cells connected in series in the same manner.

The laminated structures 400, 410, 420, and 430 are further connected in series by the bus bars 260, 262, and 264 (refer to FIG. 4) that are fixed to the heat sinks (300 and 350 in FIG. 2). All the laminated structures of unit cells that constitute the battery 100 are connected in series as described above. When this connection method is employed, connection parts of the power terminals 450A and 450B can be arranged in only one direction (i.e., the upper side of the heat sink 300). Therefore, after installing the battery, power wiring can be carried out easily, which improves productivity.

Unit Cell

Figure 6:
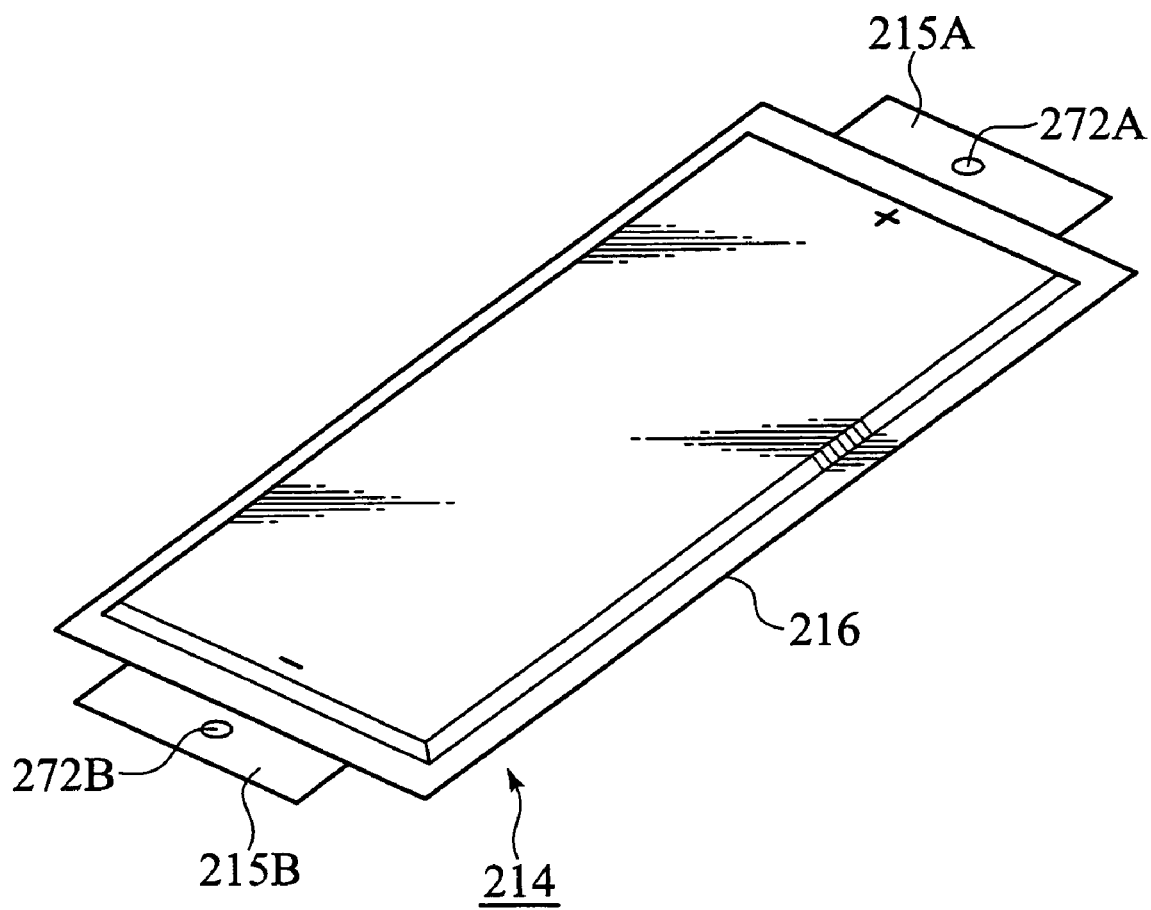
FIG. 6 is a perspective diagram of an appearance of an unit cell.

Main constituent elements of the battery will be explained in detail. The unit cell 214 used in the present embodiment is a rectangular flat laminated secondary cell as shown in FIG. 6, and has a laminated power generation element having at least positive electrode plates and negative electrode plates laminated inside in order. The unit cell 214 has a configuration as disclosed in Japanese Patent Application Laid-Open No. 2003-059486. A laminate film is used for an exterior material of the unit cell 214. The incorporated power generation elements are sealed by thermal fusion of the peripheral lamination film of the unit cell 214. Electrode tabs 215A and 215B are drawn out from both sides of the unit cell 214 in the longitudinal direction. The electrode tab 215A is a positive (cathode) electrode tab, and is made of an aluminum thin plate having a thickness of about 0.2 millimeter. On the other hand, the electrode tab 215B is a negative (anode) electrode tab, and is made of a copper thin plate of a thickness of about 0.2 mm. Insertion holes 272A and 272B for inserting the through bolt (270 in FIG. 2) are opened in both electrode tabs 215A and 215B. The periphery 216 of the unit cell 214 connected by thermal fusion is positioned and held by the holder 219 formed in the frame. The lamination direction of the unit cells is the same as that of the positive electrode plate and the negative electrode plate that constitute this power generation element.

According to the present embodiment, the battery 100 includes unit cells having electrode tabs of different polarities on opposite sides of each cell as shown in FIG. 6. However, the battery 100 may be constituted by unit cells having electrode tabs of different polarities on only one side of each cell as disclosed in Japanese Patent Application Laid-Open No. 2003-059486. While one flat unit cell is used as the unit cell according to the present embodiment, the frame can have a plurality of unit cells connected in series, a plurality of unit cells connected in parallel, or a plurality of unit cells connected in series and in parallel alternately.

Frame

Figure 7A:
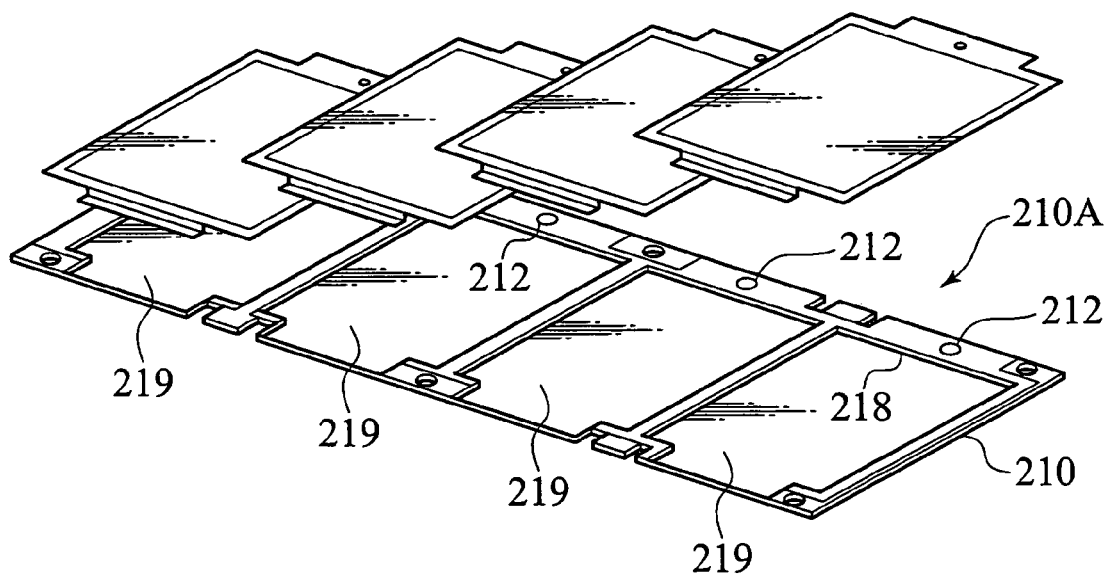
FIGS. 7A and 7B are configurational diagrams of frames of the battery according to the present invention.
Figure 7B:
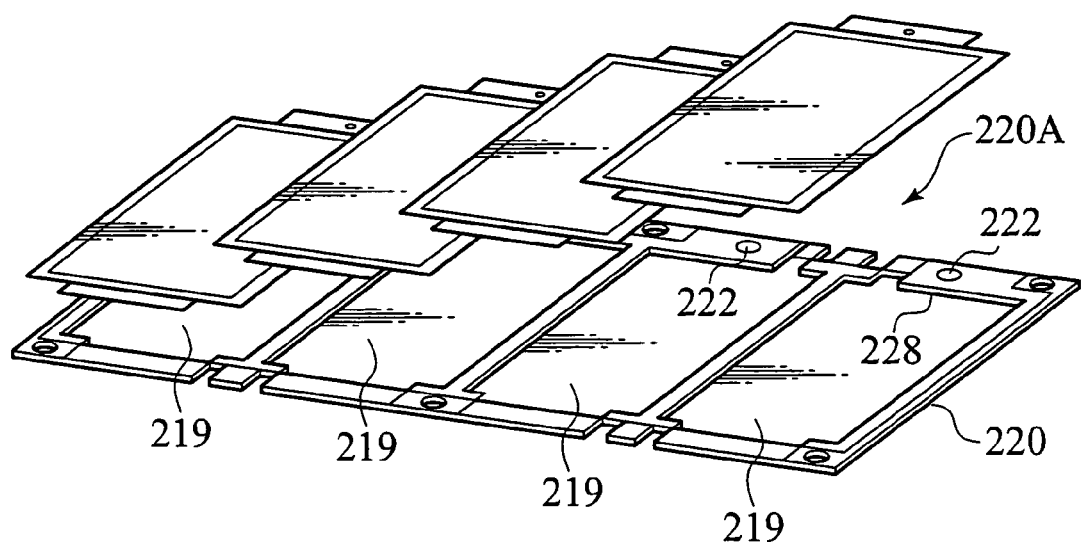

The two types of frames including the insulation washer embedded frame 210 as shown in FIG. 7A and the conductive washer embedded frame 220 as shown in FIG. 7B are used in the present embodiment.

The insulation washer 212 is embedded into one end 210A of the insulation washer embedded frame 210. The insulation washer 212 slightly thicker than the frame 210 and is thicker than the unit cell.

The conductive washer 222 is embedded into one end 220A of the conductive washer embedded frame 220. The conductive washer 222 is slightly thicker than the frame 220 and is thinner than the unit cell like the insulation washer, except the conductive washer 266 of the frame that is immediately below the intermediate heat sink 325 as depicted by the reference numeral 265 in FIGS. 2 and 3. The conductive washer has a function as a first connector that electrically connects one electrode tab of the unit cell held in the frame to one electrode tab of the unit cell held in other frame adjacent in the lamination direction.

As shown in FIGS. 7A and 7B, each of the frames 210 and 220 has a holder 219 that positions and holds four unit cells arrayed on the same plane surface. In other words, the frames 210 and 220 have the peripheral supporters 218 and 228 that support at least a part of the periphery 216 of the unit cell 214, and a positioner that positions the unit cell 214. The positioner refers to a portion formed around the peripheral supporters 218 and 228 respectively to position the peripheral end of the unit cell 214. Locate pin insertion holes, not shown, into which locate pins described later (as depicted by reference numerals 510 and 520 in FIG. 10) are inserted or formed at two corners of the frames 210 and 220 respectively.

The positioner of the frame positions the unit cell, and the peripheral supporter supports the periphery of the cell. The periphery of the unit cell and the peripheral supporter of the frame are provisionally fixed with a double-sided tape. Therefore, the unit cells can be carried easily in a state of being mounted on the frames at the manufacturing stage.

Figure 8:
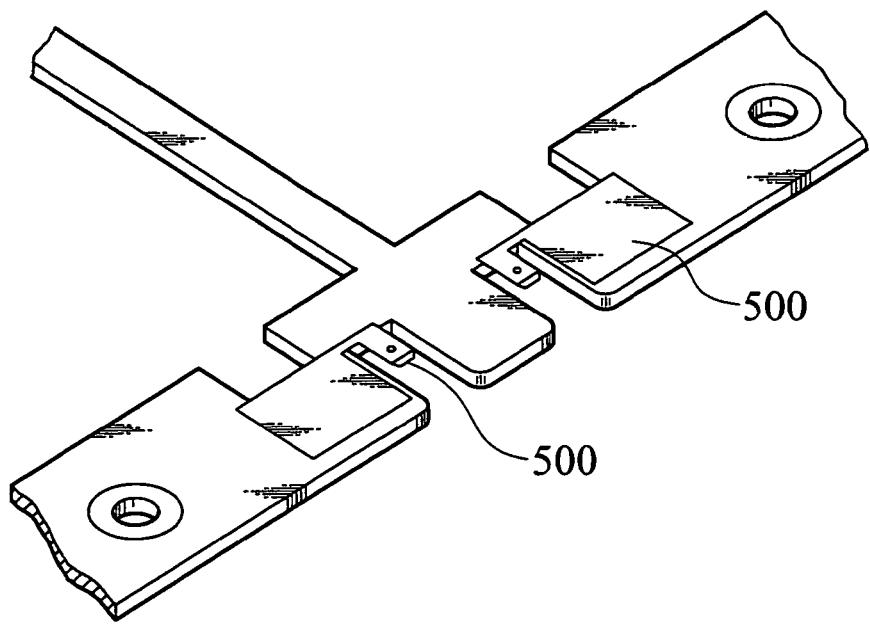
FIG. 8 is an enlarged view of a frame of a portion where a voltage detection terminal is fitted.
Figure 9:
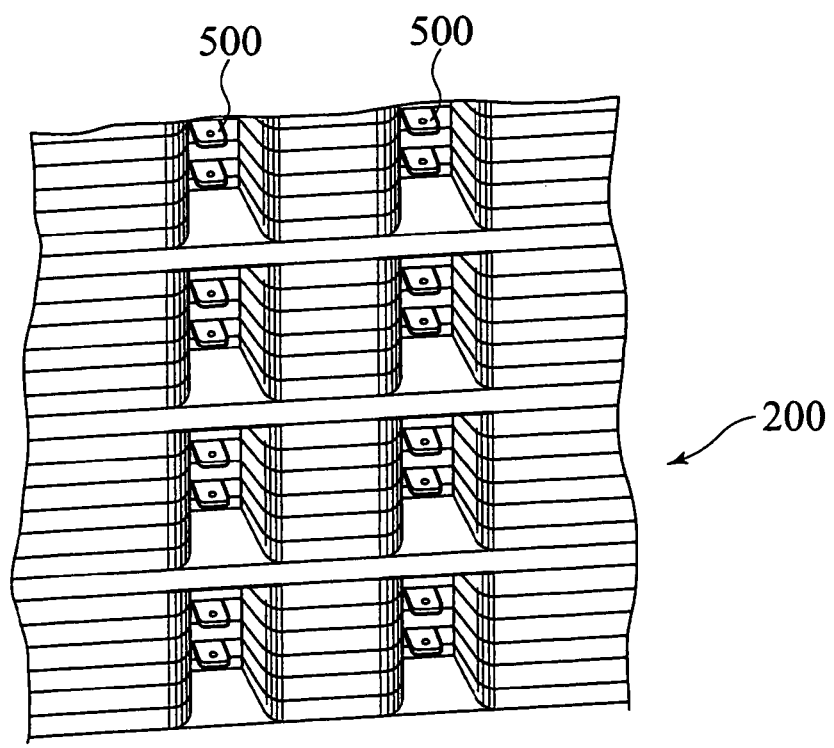
FIG. 9 is a diagram showing a state that voltage detection terminals are arranged in an unit cell.

A voltage detecting terminal 500 as shown in FIG. 8 is fitted to the end of the side of each frame at which the conductive washer or the insulation washer is fitted. The voltage detecting terminal 500 is provided to detect the voltage of each unit cell, and is connected to the electrode tab of each unit cell by welding. When the frames are stacked as shown in FIG. 1, the voltage detecting terminals 500 are laid out in rows at regular intervals in the frame lamination direction, as shown in FIG. 9. Connectors, not shown, are fitted to all the voltage detecting terminals 500 to apply voltages of the individual unit cells to a charge/discharge controller. As the voltage detecting terminals 500 are integrated with the frames, the efficiency of wiring to the voltage detecting terminals 500 improves thus improving workability.

Heat Sink

According to the present embodiment, three kinds of heat sinks are used as shown in FIG. 1, i.e., the heat sink 300 positioned at the top, at least one intermediate heat sink 325 positioned between the laminated frames, and the heat sink 350 positioned at the bottom.

Figure 10:
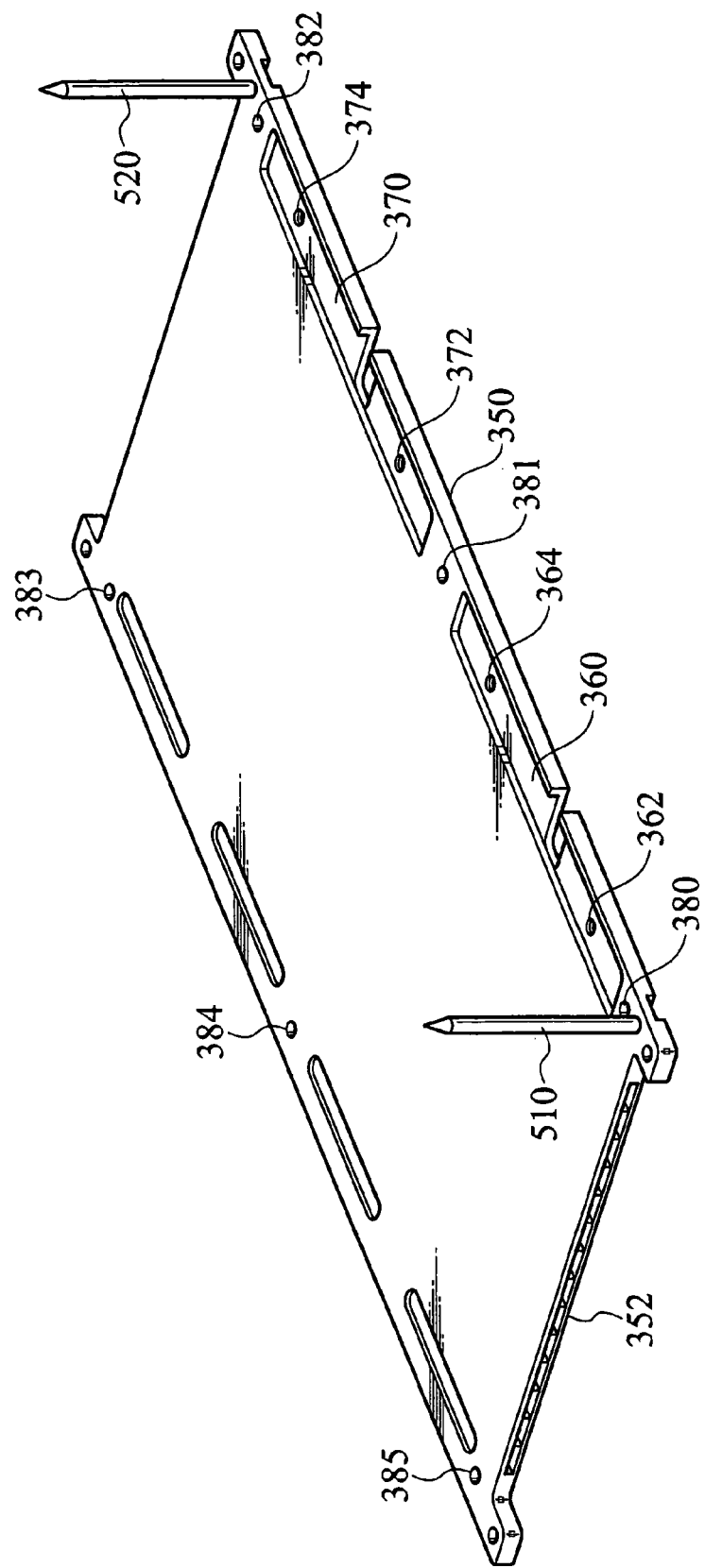
FIG. 10 is a perspective diagram of a configuration of a heat sink positioned at the bottom.

The heat sink 350 at the bottom has the locate pins 510 and 520 to position the laminated frames, as shown in FIG. 10. The frameo have the locate pin insertion holes (not shown) into which the locate pins 510 and 520 are inserted. In laminating the frames on the heat sink 350, the locate pins 510 and 520 are inserted into the locate pin insertion holes of the frames, thereby positioning the frames. At one end of the heat sink 350, bus bar embed grooves 360 and 370 are provided to embed the bus bars 260 and 264 to electrically connect in series the adjacent unit cell laminations, for example, the unit cell laminations 400 and 410 (refer to FIG. 5). Through bolt insertion holes 362, 364, 372, and 374 are formed on the bus bar embed grooves 360 and 370 to erect the through bolts 270, 275, 280, and 285 respectively (refer to FIG. 4) on the bottom of the heat sink 350. Fitting holes 380 to 385 for pressurizing units are formed on the heat sink 350. These fitting holes have a function of a holder that integrally holds the battery 200 between the heat sinks 300 and 350, and apply a suitable surface pressure to the cell unit 200.

Figure 11:
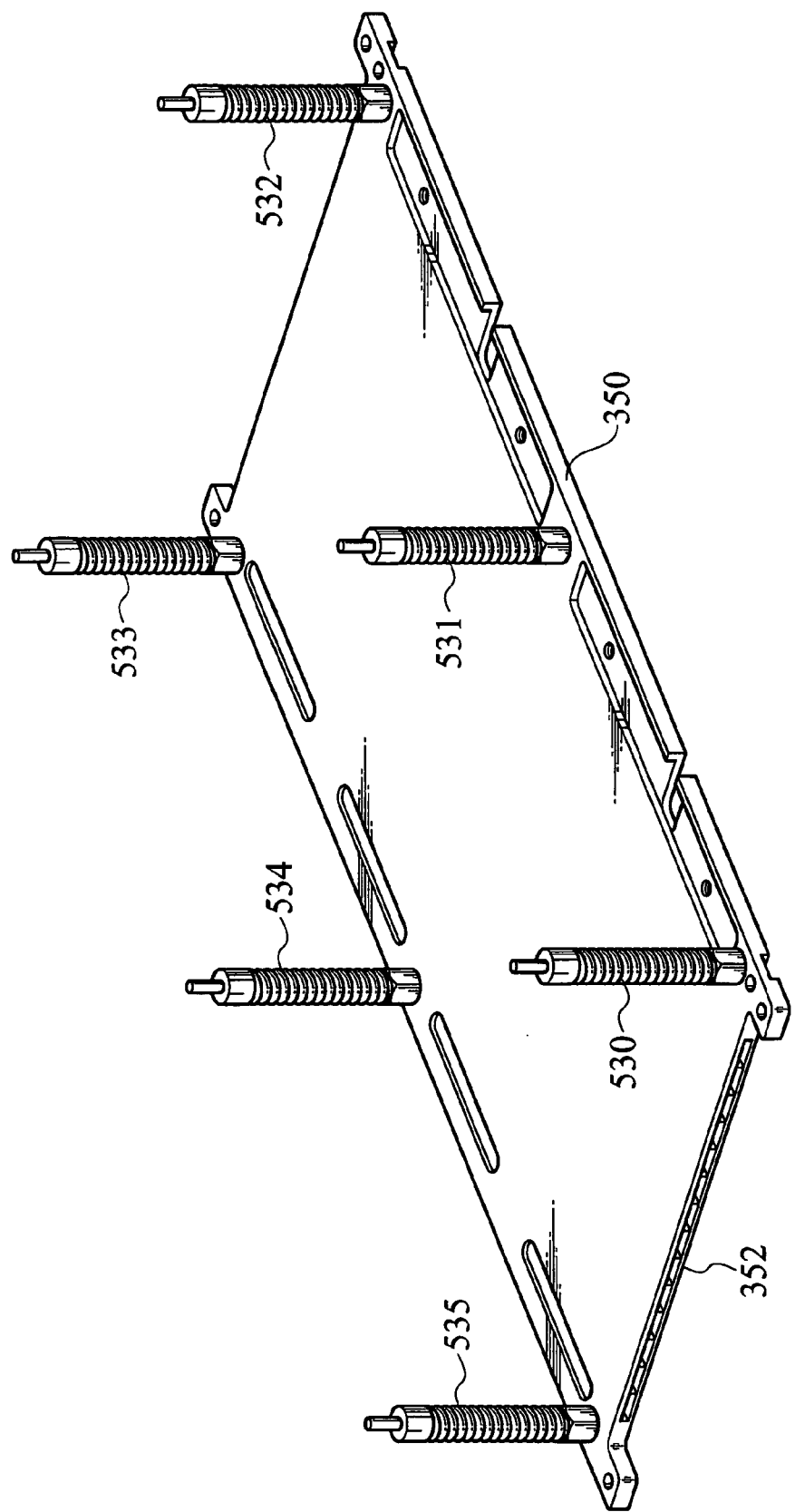
FIG. 11 is a diagram showing a state that a pressurizing unit is fitted to the heat sink positioned at the bottom.

Six pressurizing units 530 to 535 are fitted to these fitting holes 380 to 385 as shown in FIG. 11. The pressurizing units 530 to 535 can easily fine adjust the surface pressure to be applied to the cell unit 200 at the time of sandwiching the battery 200 between the heat sinks 300 and 350. Copper, aluminum, or magnesium is suitable for the material of the heat sinks 300 and 350. Preferably, aluminum is used from the viewpoint of heat dissipation and lightweight. A vent 352 is formed on the heat sink 350 to pass through the heat sink 35D in the longitudinal direction to improve heat dissipation efficiency.

Figure 13A:
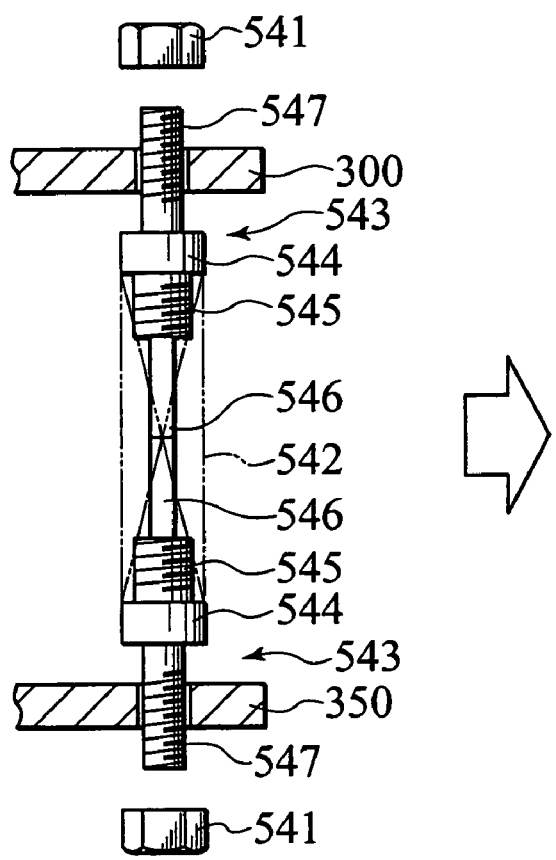
FIGS. 13A and 13B are explanatory diagrams of the operation of the pressurizing unit.
Figure 13B:
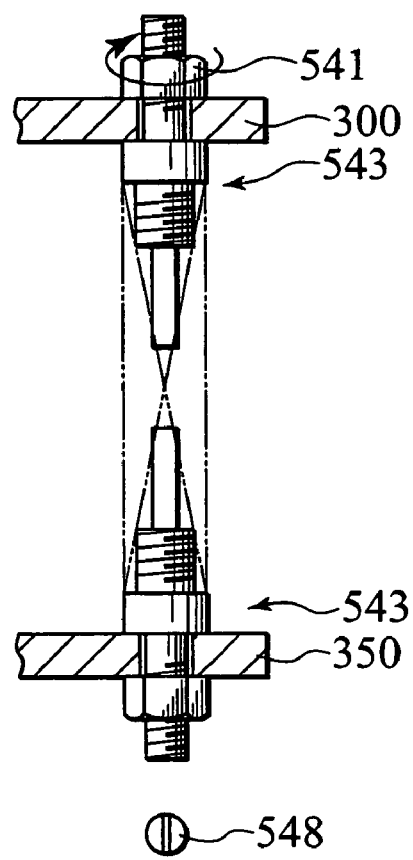

The pressurizing units 530 to 535 have the following configuration. FIGS. 12A and 12B are detailed configurational diagrams of the pressurizing unit, and FIGS. 13A and 13B are explanatory diagrams of the operation of the pressurizing unit. Specifically, FIG. 12A is a configurational diagram of the whole pressurizing unit, and FIG. 12B is a configurational diagram of a spring holder. FIG. 13A is a diagram showing the initial state of the pressurizing unit, and FIG. 13B is a diagram of the pressurizing unit fitted between the heat sinks.

The pressurizing unit 530 includes a tension coil spring 542 (i.e., an elastic unit), and spring holders 543 that holds both ends of the tension coil spring 542.

The tension coil spring 542 is fitted between the heat sinks 300 and 350 (refer to FIG. 1) in the state of being extended. With this arrangement, the tension coil spring 542 is contracted, and generates a tensile stress in a direction to bring the heat sinks 300 and 350 close to each other.

The spring holder 543 includes a main body 544, a screw 545 formed with a screw head at a larger pitch P2 than a pitch P1 of the tension coil spring 542, a butt 546 that extends from the screw 545 toward the center of the tension coil spring 542, and a thruster 547 that extends from the main body 544 and is thrust into the heat sinks 300 and 350.

The main body 544 has a larger diameter than that of the tension coil spring 542, and is brought into contact with the tension coil spring 542 to avoid the escape of the tension coil spring 542. The main body 544 is brought into contact with the heat sinks 300 and 350 when the pressurizing unit 530 is fitted to the battery.

The screw 545 is tucked into the end of the tension coil spring 542, and is meshed with the inside of the tension coil spring 542, thereby fixing this spring, as shown in the drawings. Screw heads are formed on the surface of the screw 545 at the pitch P2 as shown in FIG. 12B. The pitch P2 of the screw 545 is larger than the pitch P1 of the tension coil spring 542. Therefore, the screw 545 can be tucked into a direction of an arrow mark shown in FIG. 12B. When the screw 545 is tucked, the butt 546 proceeds toward the center of the tension coil spring 542.

When the screw 545 is tucked from both ends of the tension coil spring 542, the butts 546 proceeding from both sides are collided as shown in FIG. 12A. In this state, the tension coil spring 542 is stretched from the natural length, and initial tension is applied as the initial state of the pressurizing unit 530.

Screw heads that can be fastened with a nut 541 are formed at the front end of the thruster 547. A slit 548 to prevent rotation described later is provided at the top of the thruster 547. Rotation of the spring holder 543 can be stopped easily by inserting a flathead screwdriver or the like into the slit 548.

The pressurizing unit 530 is disposed between the heat sinks 300 and 350 as shown in FIG. 13A.

The thruster 547 is pierced through the fitting hole of the heat sink 300. In this state, the thruster 547 of one spring holder 543 is fastened with the nut 541 while stopping the rotation of the other spring holder 543. Then, the spring holder 543 is drawn to the nut 541. When both spring holders 543 are operated in this way, the spring holders 543 are relatively detached in the state of holding the tension coil spring 542, with the tension coil spring 542 held in the state of being extended between the heat sinks 300 and 350, as shown in FIG. 13B.

The tension coil spring 542 is extended to match the distance between the heat sinks 300 and 350. Therefore, elasticity is obtained in a direction to contract the tension coil spring 542, regardless of the fastening torque of the nut 541. The elasticity works to pressurize the unit cells that constitute the battery 200.

As shown in FIG. 14, the intermediate heat sink 325 has locate pin through holes 330 and 332 to pass through the locate pins 510 and 520, pressurizing unit through holes 335 to 340 to pass through the pressurizing units 530 to 535, and through bolt through openings 341 to 344 to pass through the through bolts.

The intermediate heat sink 325 is positioned by inserting the locate pins 510 and 520 fitted to the heat sink 350 into the locate pin insertion holes 330 and 332. Three intermediate heat sinks 325 are interposed at equal intervals in the battery 200. The intermediate heat sinks 325 can be made of the same material as that of the heat sink 350, or can be made of a resin with satisfactory thermal conductivity by taking lightweight into consideration.

Figure 15:
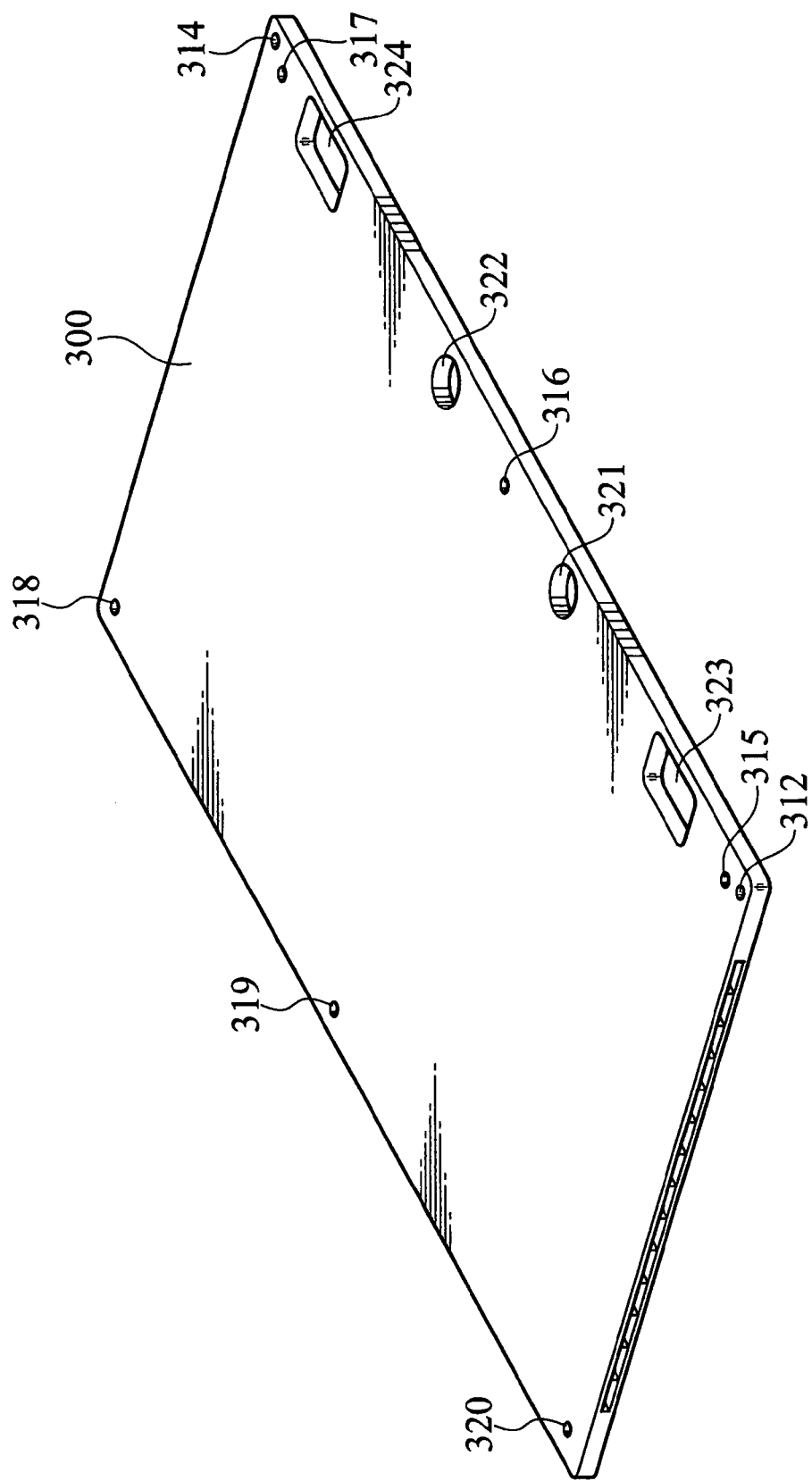
FIG. 15 is a perspective diagram of a configuration of a heat sink positioned at the top.

As shown in FIG. 15, the heat sink 300 at the top is formed with locate pin insertion holes 312 and 314 to insert the locate pins 510 and 520, bolt insertion holes 315 to 320 to pierce the bolts fitted to the top of the pressurizing units 530 to 535 and fix these bolts with the nuts 310A to 310F, through bolt through openings 321 and 322 to pierce the through bolts, and power terminal fitting holes 323 and 324 to fit the power terminals 450A and 450B (refer to FIG. 4). The heat sink 300 is positioned by inserting the locate pins 510 and 520 into the locate pin insertion holes 312 and 314. At the time of positioning the heat sink 300, the bolts fitted to the top of the pressurizing units 530 to 535 are inserted into the bolt insertion holes 315 to 320, and the heat sink 300 is fixed with the nuts 310A to 310F. Based on this fixing, the heat sinks 300 and 350 are integrated with the battery 200. The through bolts are inserted into the through bolt through openings 321 and 322 from top to down in the drawing. The bus bar 262 (refer to FIG. 4) is fitted to these through bolts. The power terminals 450A and 450B are fitted to the power terminal fitting holes 323 and 324, and these power terminals are connected to the charger or the motor of the power source.

The heat sinks 300 and 350 function as a holder that integrally holds the battery 200 by pressurizing this cell unit from both sides in the lamination direction. This holder has a function of a pressurizing unit that applies a surface pressure in the lamination direction to all the unit cells constituting the battery 200, and a function of a cooler that dissipates the heat generated from the battery 200. The heat sinks 300 and 350 have a function of fitting the bus bar (such as that designated by 260 in FIG. 4) as a third connector to electrically connect one laminated structure of unit cell (such as the cell lamination 400 in FIG. 5) constituting the battery 200 to other laminated structure (such as the cell lamination 410 in FIG. 5).

Manufacturing Procedures of the Battery

Manufacturing procedures of the battery according to the present embodiment will be explained in detail based on the drawings. The battery according to the present invention is manufactured at both a cell module forming stage and a unit cell forming stage.

Cell Module Forming Stage

Figure 16:
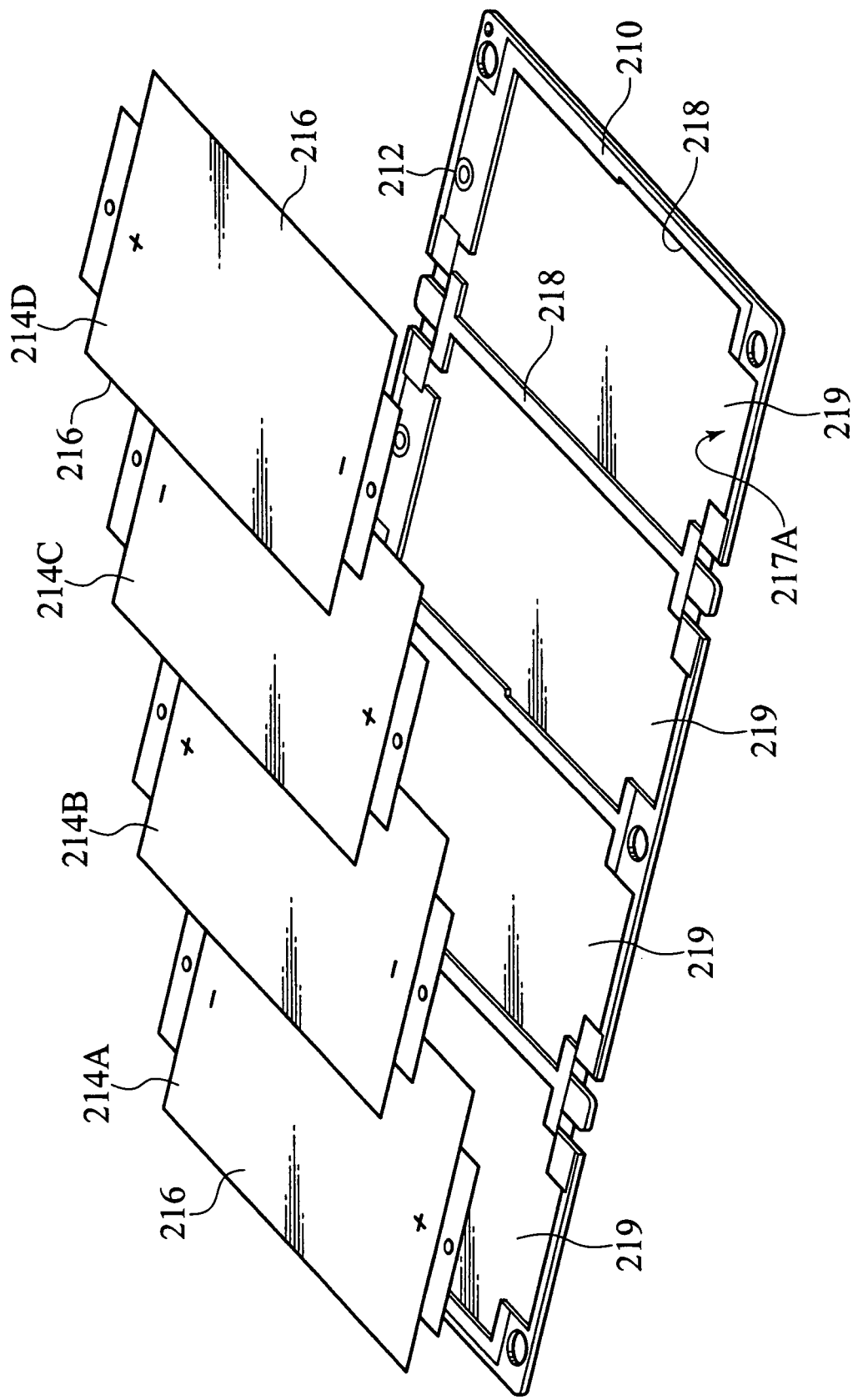
FIG. 16 is an explanatory diagram of a manufacturing procedure of the battery according to the present invention.
Figure 17:
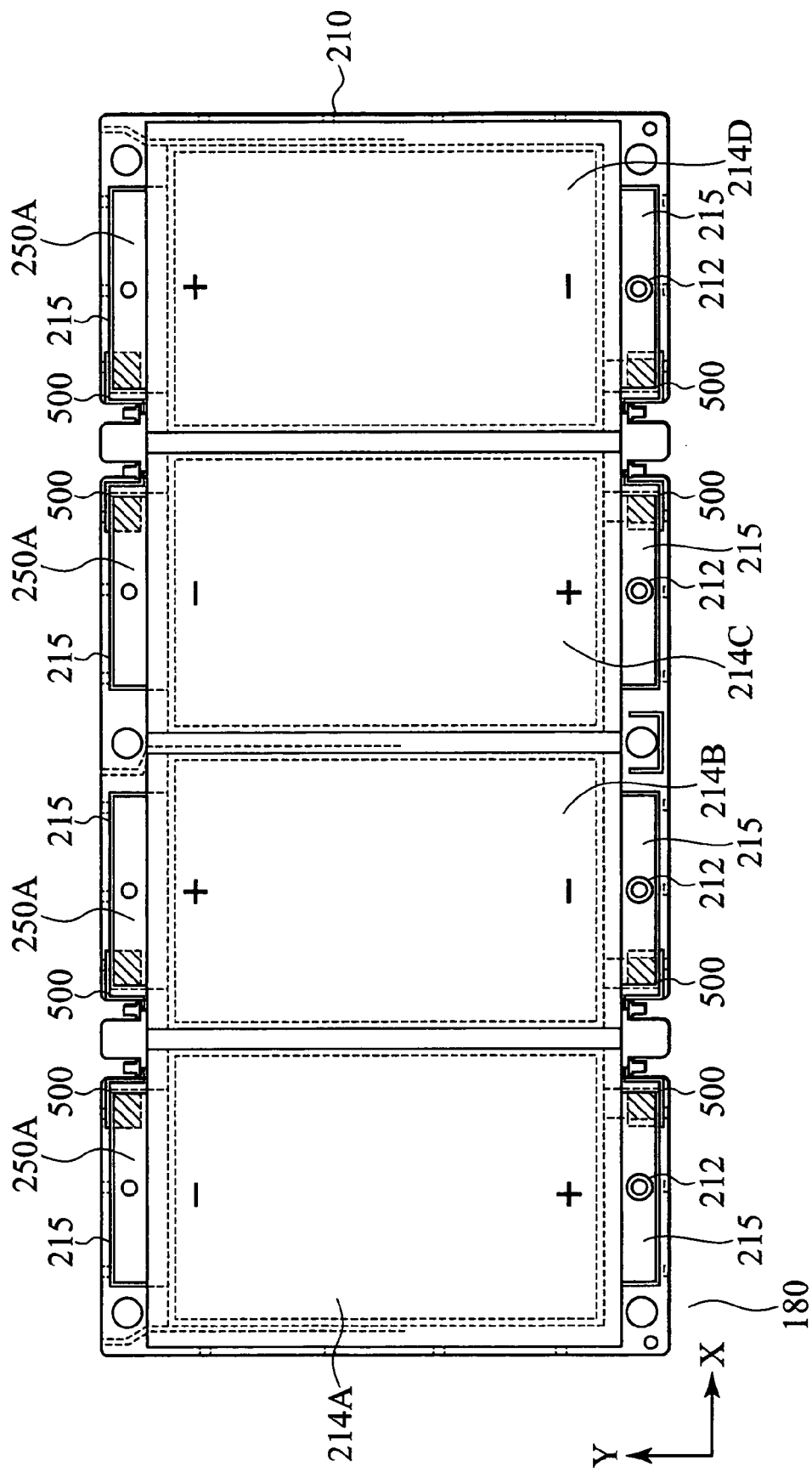
FIG. 17 is an explanatory diagram of a manufacturing procedure of the battery according to the present invention.

First, as shown in FIG. 16, four unit cells 214A to 214D are mounted on the plate frame 210 positioned in the bottom layer of the battery 200. In mounting the unit cells, a very thin double-sided tape is adhered to the periphery 216 of each unit cell, and the periphery 216 is mounted on the peripheral supporter 218 of the frame 210, thereby fitting the unit cell into the positioner. Based on this, the four unit cells are provisionally fixed by the frame, and can be transported at the manufacturing site. The four unit cells are mounted on the frame in the state shown in FIG. 17. In arranging the unit cello on the frame, the polarities (positive/negative) of the electrode tab 215 are in the alternate order in the layout direction of the unit cells as shown in FIG. 16 and FIG. 17. In other words, the layout directions of the unit cell s are alternately changed so that the different polarities are positioned adjacent to each other.

The electrode tab 215 at one side of each of the unit cells 214A to 214D arrayed on the frame 210 is welded to the voltage detecting terminal 500 by ultrasonic welding as shown in FIG. 17. The electrode tab at one side refers to the electrode tab positioned at the side of the frame 210 where the conductive washer or the insulation washer is embedded. Therefore, at this stage, each frame is ultrasonically welded at four positions as shown in FIG. 17 (i.e., at the electrode tab 215 and the voltage detecting terminal 500 at the bottom side of the drawing).

Figure 18:
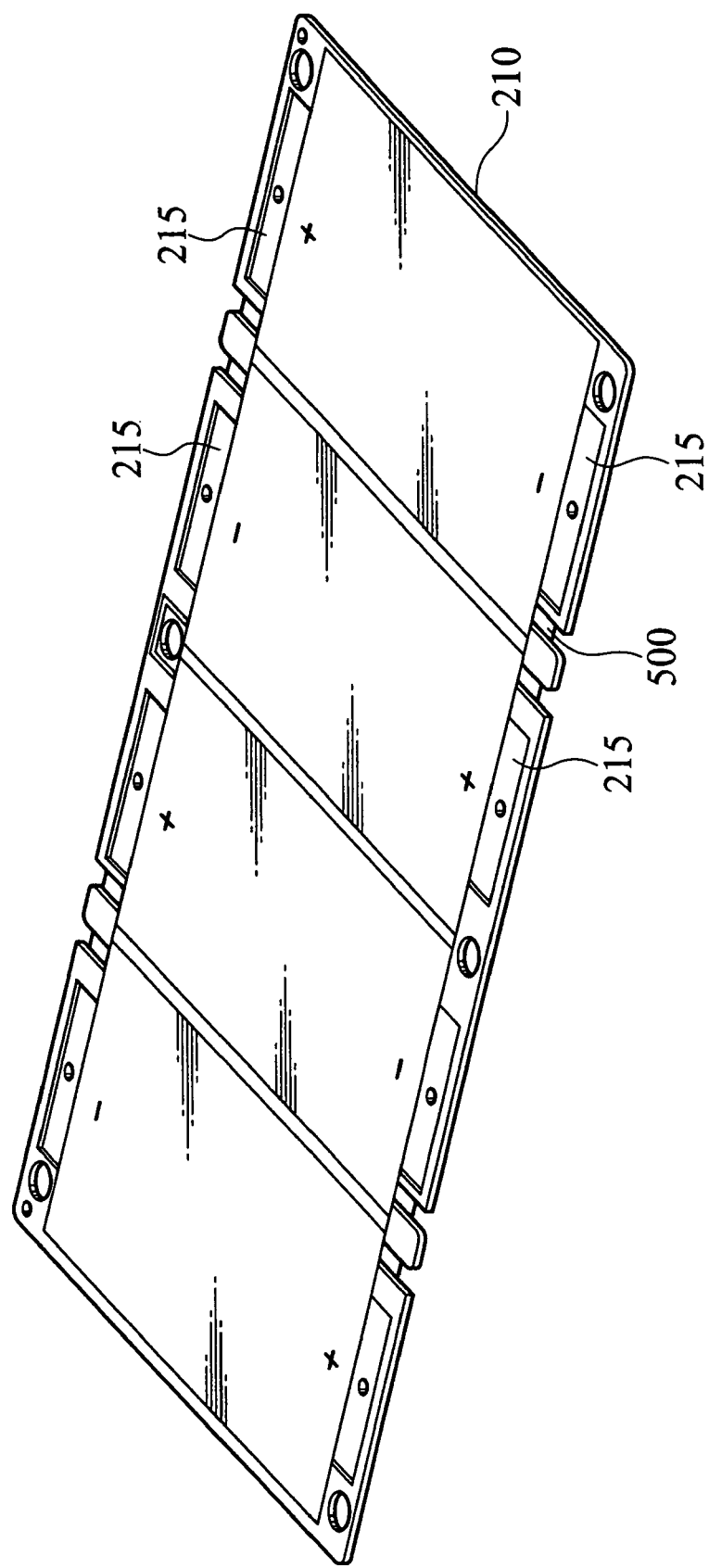
FIG. 18 is an explanatory diagram of a manufacturing procedure of the battery according to the present invention.

The arrangement of the unit cells and the connection between the electrode tab and the voltage detecting terminal are carried out for twenty four frames that constitute the battery 200. The polarities of the unit cells must be alternately arranged in the lamination direction of the frames, as well as in the cell layout direction as shown in FIG. 18. For example, when the unit cells mounted on the frame in the bottom layer have polarities in the order of positive, negative, positive, and negative from the left side at the bottom of FIG. 17, the unit cells mounted on the frame laminated on this frame must have polarities in the order of negative, positive, negative, and positive from the left side at the bottom. The unit cells are laid out in this way so as that the series circuit as shown in FIG. 5 is constituted.

Laminated Structure Forming Stage

Figure 19:
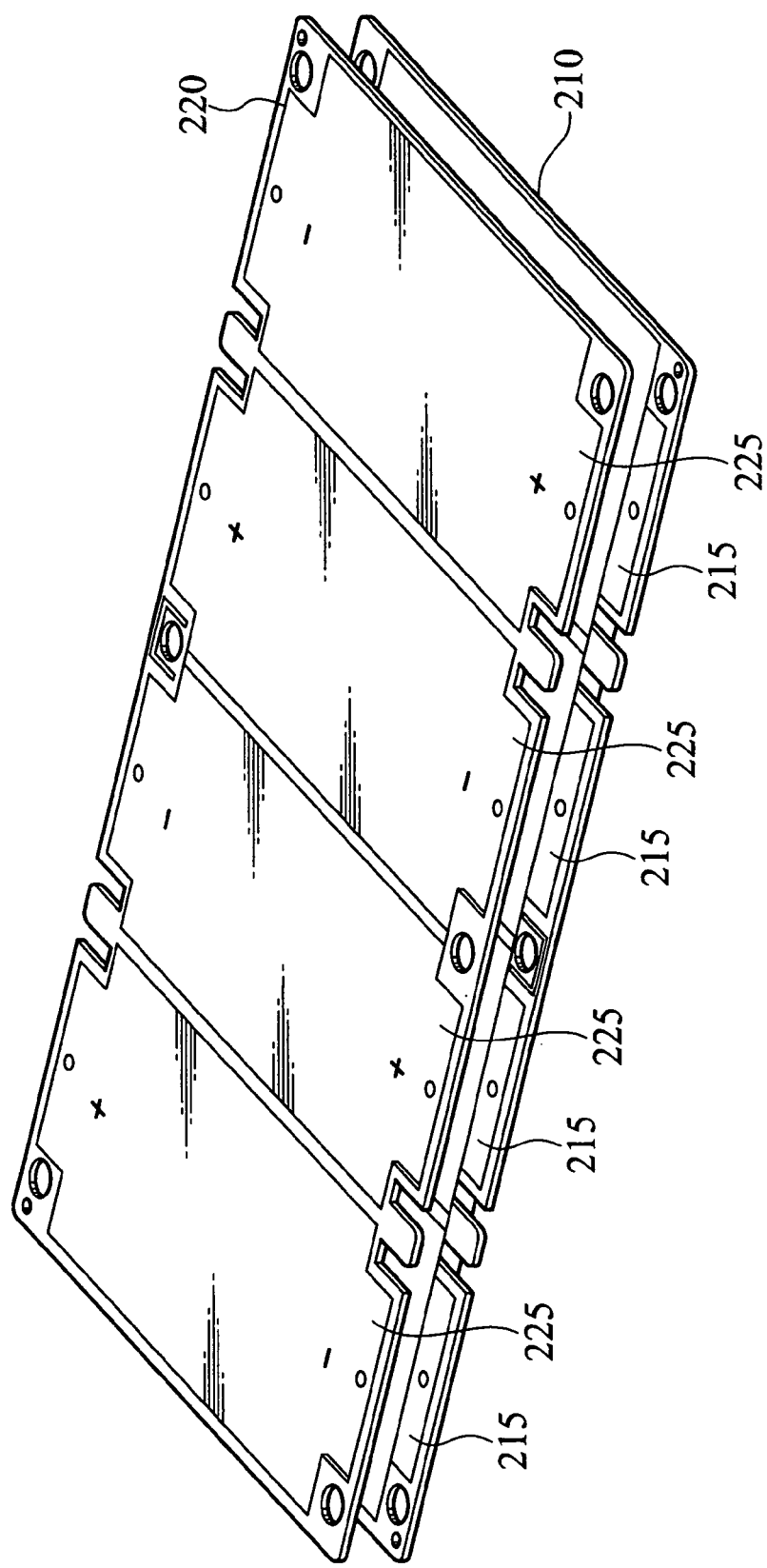
FIG. 19 is an explanatory diagram of a manufacturing procedure of the battery according to the present invention.

The frame 220 embedded with the conductive washer is stacked on the frame 210 embedded with the insulation washer 212, as shown in FIG. 19. The frames are stacked such that the sides of the frames fitted with the conductive washer and the insulation washer are in the same direction. The opening 217A is formed at the end of the side of the frame where the conductive washer and the insulation washer are not fitted, as shown in FIG. 16. A tool of an ultrasonic welder is inserted into the opening 217A at the lower side of the frame 210 and the upper side of the frame 220 respectively. The tools sandwich the electrode tabs of the unit cells mounted on the frame 210 and the frame 220, thereby carrying out the ultrasonic welding. This ultrasonic welding is carried out to the electrode tabs 215 and 225 at one side of the four sets of unit cells as shown in FIG. 19.

In welding the electrode tabs, the ultrasonic welding is used for the following two reasons. According to the ultrasonic welding, high frequency oscillation is applied to a portion to be welded, thereby diffusing a metal atom. By recrystallizing the metal atom, the electrode tabs are mechanically connected. Therefore, the ultrasonic welding is very effective to weld the same kind of or different kinds of metals together. The unit cell used in the present embodiment has one thin electrode tab made of aluminum and the other thin electrode tab made of copper. The bus bar and the voltage detection terminal are made of copper. Therefore, the connection between the electrode tabs and the connection between the electrode tab and the voltage detecting terminal are the connections between different kinds of metals. This is one reason for using the ultrasonic welding. According to the ultrasonic welding, maximum temperature of the connection surface is not high, and can be suppressed to about 35% to 50% of the fusing point. Therefore, the base metal is not fused or a weak cast structure is not formed at the time of a high-temperature welding. The unit cell used in the present embodiment has an exterior made of a laminate material, and the electrode tab cannot be heated to a high temperature. Therefore, in order to connect the electrode tab formed with a very thin metal without exposing the unit cell to a high temperature, the ultrasonic welding is most appropriate. This is the second reason.

The above welding achieves the connection between the electrode tabs 215 and 225 and the voltage detecting terminal 500 as shown in FIG. 17 and FIG. 18. Based on the above operation, the frame 210 embedded with the insulation washer 212 and the frame 220 embedded with the conductive washer form one set of frame unit. This welding is carried out for twelve sets of frame units that constitute the battery 200. After the welding operation, the insulation tape 250A is adhered to the external surface of the electrode tab 215 as shown in FIG. 17 to provide electric insulation between the frame units when the frame units are laminated.

Figure 20:
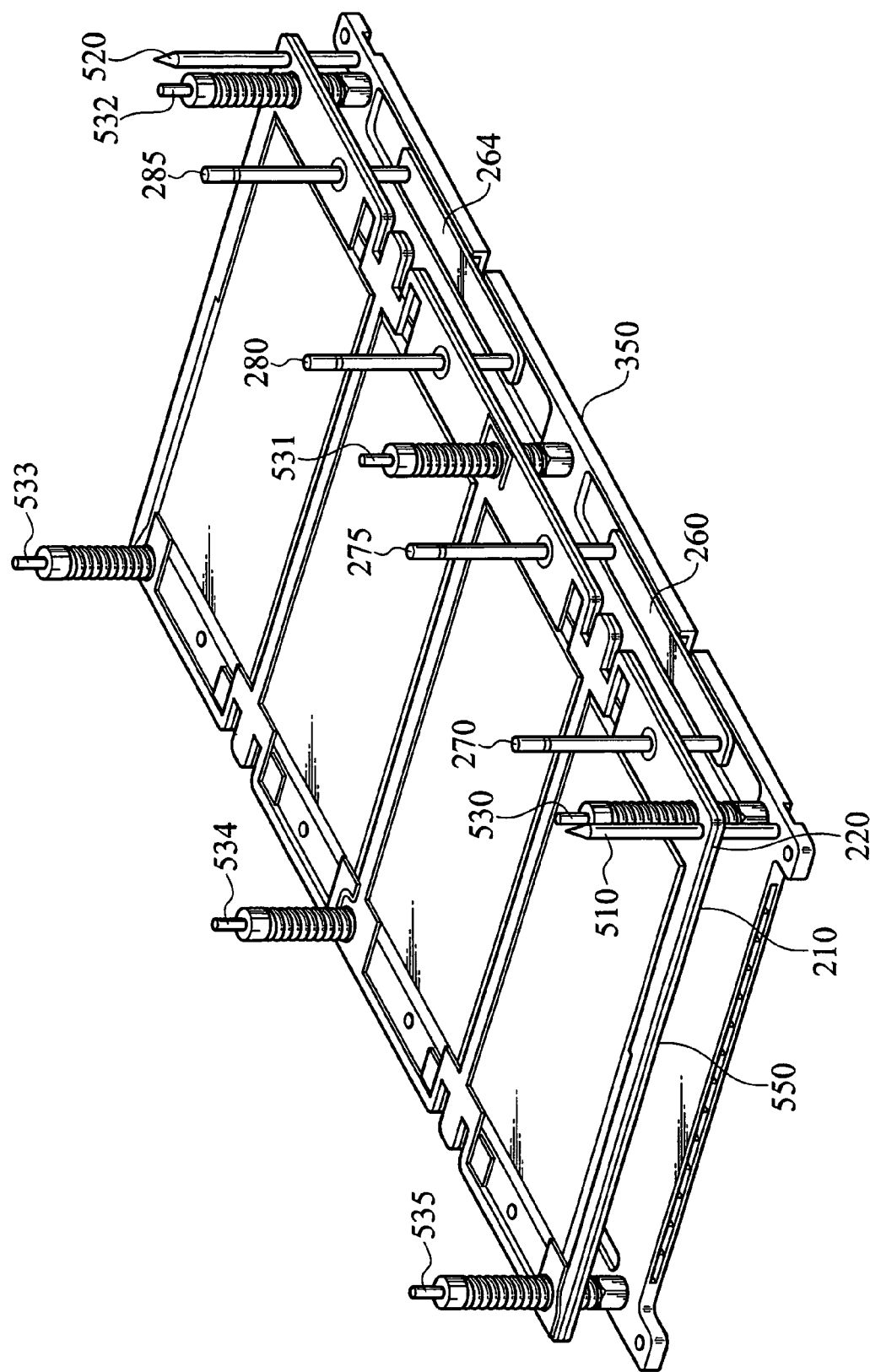
FIG. 20 is an explanatory diagram of a manufacturing procedure of the battery according to the present invention.

Next, as shown in FIG. 20, the locate pins 510 and 520 are erected on the heat sink 350. The pressurizing units 530 to 535 are fitted, the bus bars 260 and 264 are set, and the through bolts 270, 275, 280, and 285 are fitted. The locate pins 510 and 520, the pressurizing units 530 to 535, and the through bolts 270, 275, 280, and 285 are passed through the holes formed respectively on the frame unit 550. The frame unit 550 is mounted on the heat sink 350, with the frame fitted with the conductive washer faced upward as shown in FIG. 20. The unit cells mounted on the frame are directly in contact with the bus bar 260 or 264 and are electrically connected. The insulation washer insulates the bus bars 260 and 264 from the heat sink 350.

Figure 21:
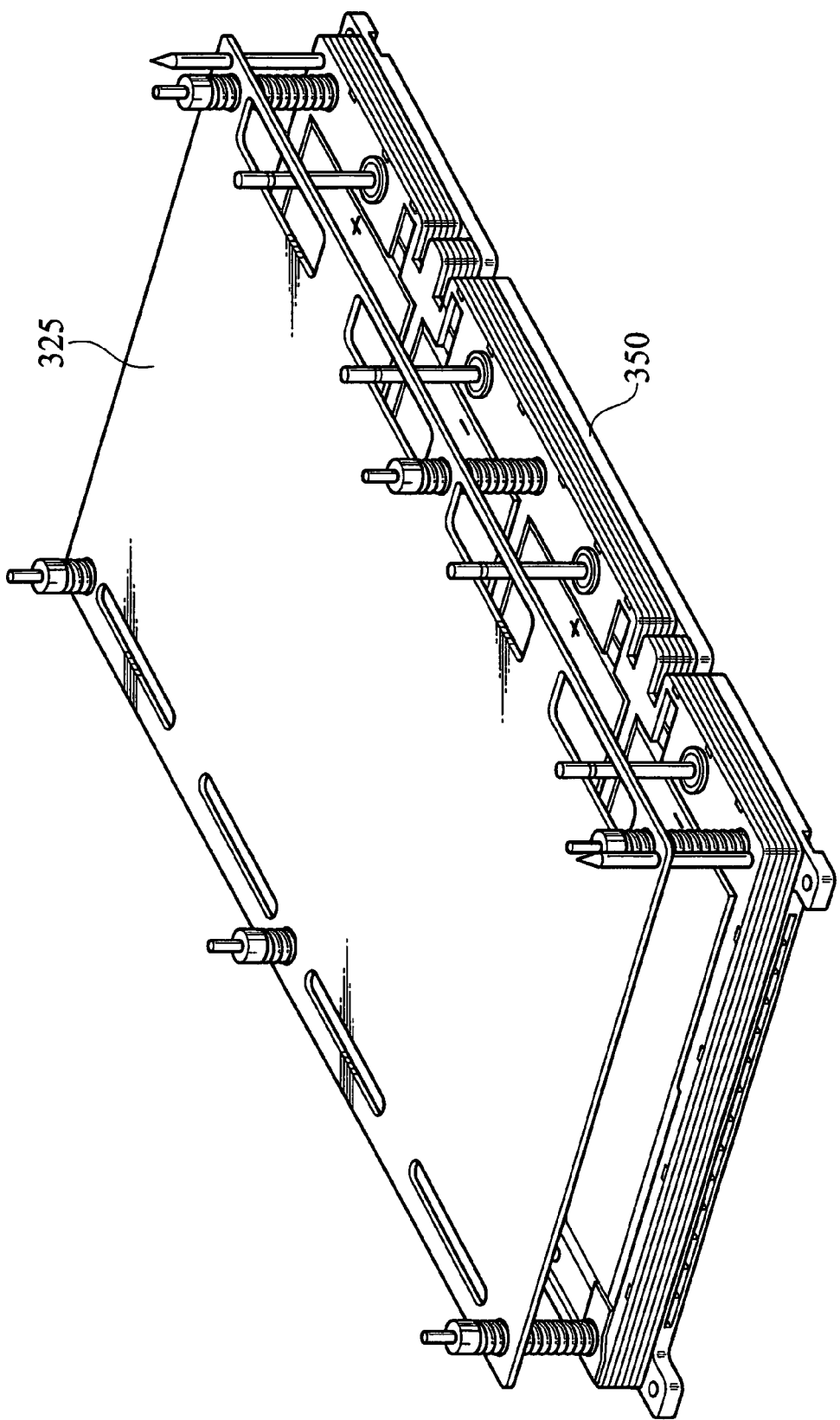
FIG. 21 is an explanatory diagram of a manufacturing procedure of the battery according to the present invention.

Three sets of the frame units 550 are laminated, with the frame fitted with the conductive washer faced upward as shown in FIG. 21. The lamination of the three sets of frame units provides the lamination of six unit cells. As the frame has opening at portions other than the periphery that supports the unit cell, the external surfaces of the unit cells stacked in the lamination direction are brought into direct contact with each other. The intermediate heat sink 325 is stacked on the three sets of frame units as shown in FIG. 21. Therefore, six unit cells are sandwiched between the heat sink 350 and the intermediate heat sink 325. Since the external surfaces of the unit cells are in direct contact with each other, the heat generated inside the unit cells is efficiently transmitted to the heat sink 350 and the intermediate heat sink 325, and is dissipated. Part of the heat is of course indirectly transmitted from the frame to the heat sinks. Preferably, materials of satisfactory thermal conductivity are used for the frames in view of heat dissipation.

Further, three sets of frame units, the intermediate heat sink 325, three sets of frame units, the intermediate heat sink 325, and three sets of frame units are laminated on the intermediate heat sink 325. Lastly, the heat sink 300 is stacked, and is provisionally fastened with the nuts 310A to 310F (refer to FIG. 1). The nuts are provisionally fixed with the through bolts 270, 275, 280, and 285.

According to the present embodiment, the conductive washer has a thickness equal to or smaller than that of the unit cell. Therefore, a simple lamination of the frame units does not cause electric conduction between the frame units, and thus enables a worker to carry out work without considering voltage. To facilitate the work without considering the voltage, the voltage is preferably equal to or less than 40 volts. Each time when one frame unit is laminated, it is preferable to insert one insulation washer made of paper into the through bolt 270, thereby securely insulating each frame unit. With this arrangement, the battery can obtain a high voltage between the power terminals 450A and 450B. This securely prevents the worker from being exposed to a high voltage. Therefore, none of the unit cells are electrically connected when the through bolts 270, 275, 280, and 285 are provisionally fixed with the nuts as described above.

After the battery 100 is assembled and the insulation washer made of paper is inserted, the insulation washer interposed between the frame units is removed. When all the provisionally fixed nuts are fastened, a surface pressure is applied to each unit cell, and the electrode tab is brought into contact with the conductive washer. As a result, all the unit cells constituting the battery 100 are connected in series between the power terminals 450A and 450B as shown in FIG. 5, thereby obtaining a high voltage between the power terminals 450A and 450B.

According to the present embodiment, one electrode tab of the unit cell is ultrasonically welded, and the other electrode tab is fixed with the through bolt as described above. Alternately, the electrode tabs at both sides can be fixed with the through bolts. In fixing the electrode tabs at both sides with the through bolts, the conductive washer and the insulation washer are passed through the trough bolts alternately to make the adjacent electrode tabs conductive or insulate these electrode tabs from each other. In this case, the voltage detecting terminal may be set by inserting the conductive washer to which the terminal is connected into the through bolt. Alternately, both electrode tabs can be ultrasonically welded. In this case, the ultrasonic welding needs to be carried out while laminating the frames. Therefore, to make it possible to set the ultrasonic welding tool in a narrow space, the drawing position of the electrode tab of the unit cell can be changed depending on the lamination position. For example, when the unit cell is mounted on the frame unit in the bottom layer, the electrode tab of the unit cell is offset at the left side. When the unit cell is mounted on the frame unit that is stacked on the frame unit in the bottom layer, the electrode tab of the unit cell is drawn out from the center as usual. When the unit cell is mounted on the next frame unit stacked on the frame unit, the electrode tab of the unit cell is offset at the right side. Based on this arrangement, when the frame units are in the laminated state, the installation space for the ultrasonic welding tool can be secured easily.

Second Embodiment

According to a battery of a second embodiment, a method of connecting between the unit cells is different from that of the first embodiment. Specifically, unit cells arrayed in the frame are connected in series within the frame to form a cell module 185. These unit cells are further connected in series between adjacent frames in the lamination direction of the unit cells to form the battery 200. All the unit cells included in the battery 200 are connected in series.

Figure 22:
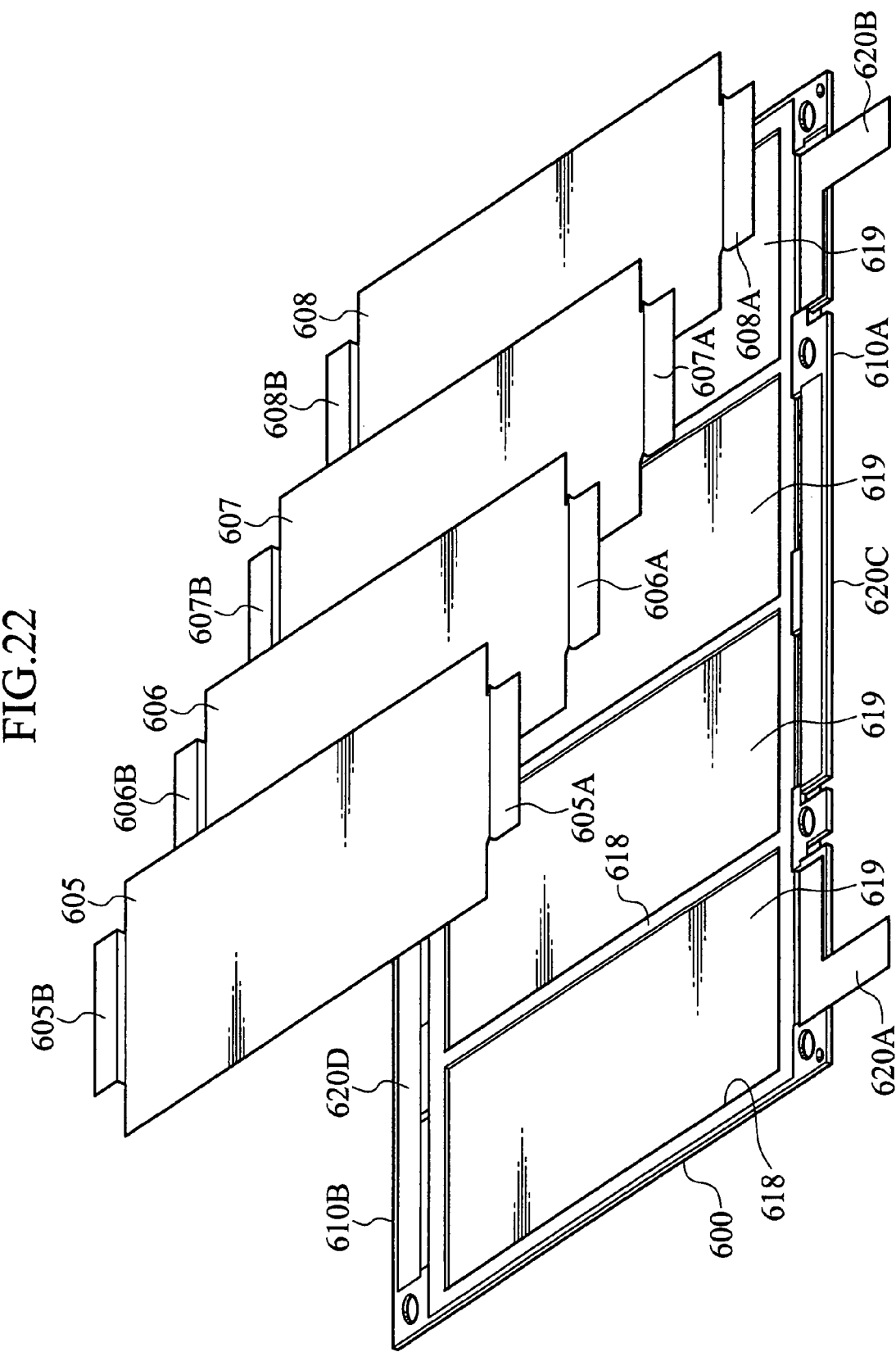
FIG. 22 is a perspective diagram of a frame together with electric unit cells to be mounted on the frame according to a second embodiment of the present invention.
Figure 23:
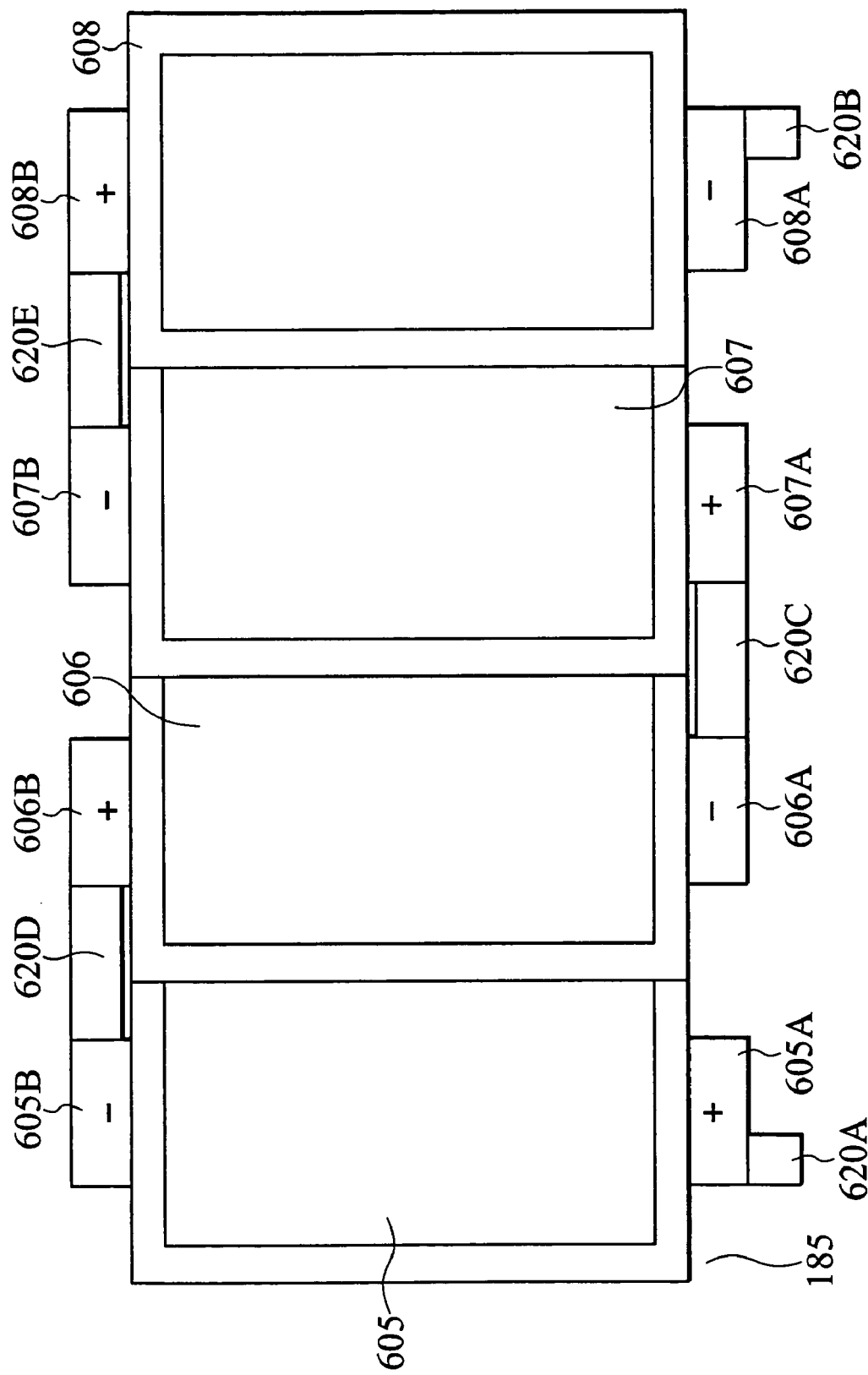
FIG. 23 is a top plan view of the frame together with the electric unit cells to be mounted on the frame.

According to the present embodiment, a frame 600 having a configuration as shown in FIG. 22 and FIG. 23 is used to connect in series the unit cells arrayed in the frame. FIG. 22 is a perspective diagram of the frame 600 together with unit cells 605 to 608 to be mounted on the frame 600. FIG. 23 is a schematic top plan view of the frame 600 on which the unit cells 605 to 608 are mounted.

As shown in these drawings, the frame 600 has L-shaped bus bars 620A and 620B at both sides of one end 610A of the frame, and has an I-shaped bus bar 620C at the center of this end 610A. The frame 600 has I-shaped bus bars 620D and 620E at the other end 610B of the frame. Each frame has a holder 619 that holds four unit cells arrayed on one surface, like the frame explained in the first embodiment. In other words, each frame has a peripheral supporter 618 that supports at least a part of the periphery of the unit cell, and a positioner that positions the unit cells. The positioner is a portion formed around the peripheral supporter to position the peripheral end of the unit cell. The frame positioner fixes the position of the unit cell, and the peripheral supporter supports the periphery of the unit cell. The periphery of the unit cell and the peripheral supporter of the frame are provisionally fixed with a double-sided tape. Therefore, the unit cells can be carried easily in the state of being mounted on the frames at the manufacturing stage.

When the unit cells 605 to 60B are mounted on the frame 600, an electrode tab 605A of the unit cell 605 is brought into contact with the bus bar 620A. and an electrode tab 605B of the unit cell 605 is brought into contact with a bus bar 620D. An electrode tab 606A of the unit cell 606 is brought into contact with the bus bar 620C, and an electrode tab 606B of the unit cell 606 is brought into contact with the bus bar 620D. An electrode tab 607A of the unit cell 607 is brought into contact with the bus bar 620C, and an electrode tab 607B of the unit cell 607 is brought into contact with the bus bar 620E. An electrode tab 608A of the unit cell 608 is brought into contact with the bus bar 620B, and an electrode tab 608B of the unit cell 608 is brought into contact with the bus bar 620E.

The unit cells are mounted on the frame 600 such that the polarities of the unit cells are arranged alternately as shown in FIG. 23. With this layout of the unit cells, all the unit cells mounted on one frame are connected in series. The bus bars 620A to 620E function as a second connecting unit that electrically connects one electrode tab of the unit cell held in the frame to one other electrode tab of other unit cell held in the frame.

Figure 24:
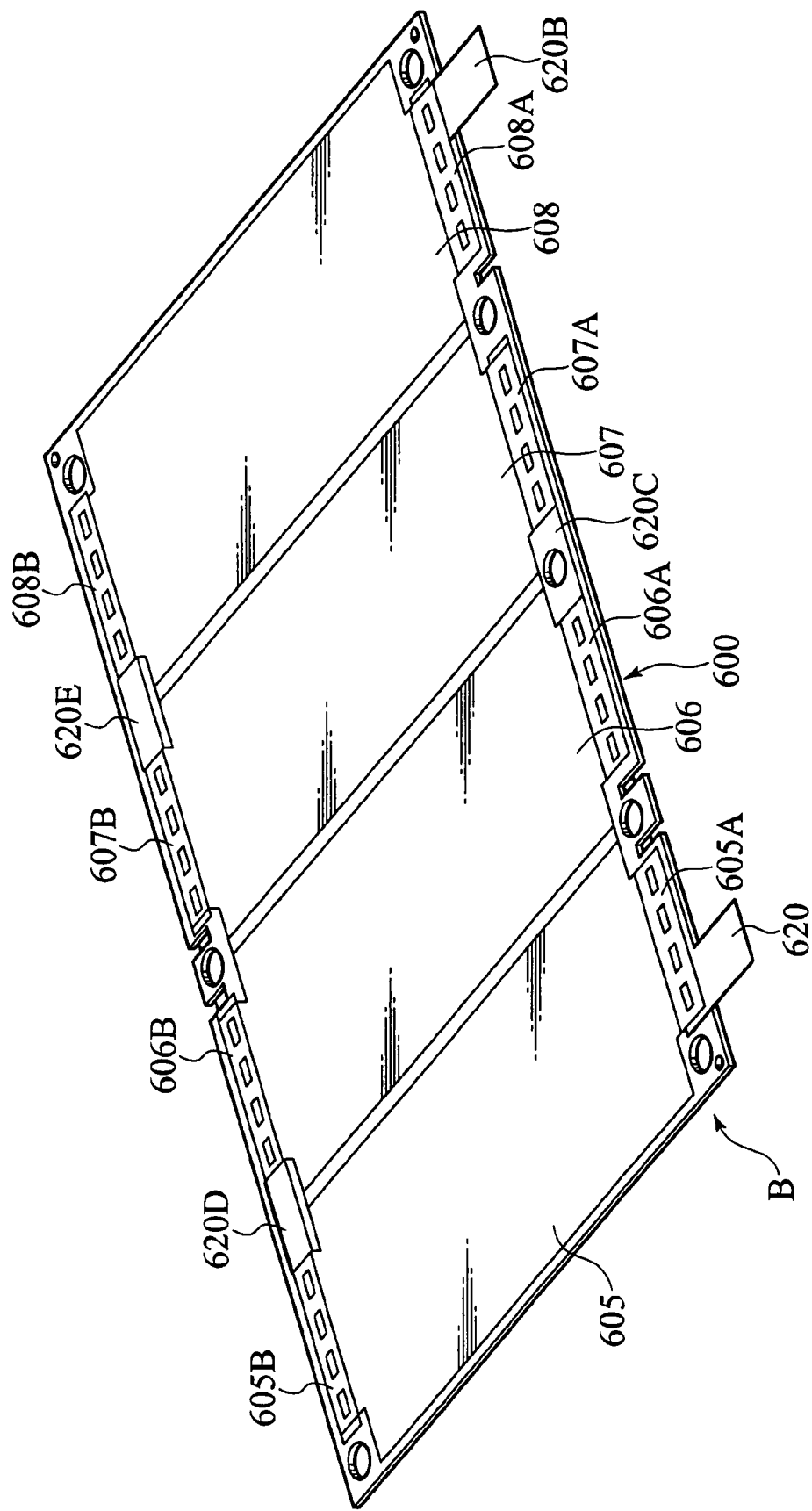
FIG. 24 is an explanatory diagram showing a state of a connection between an electrode tab of a unit cell and a bus bar.
Figure 25:
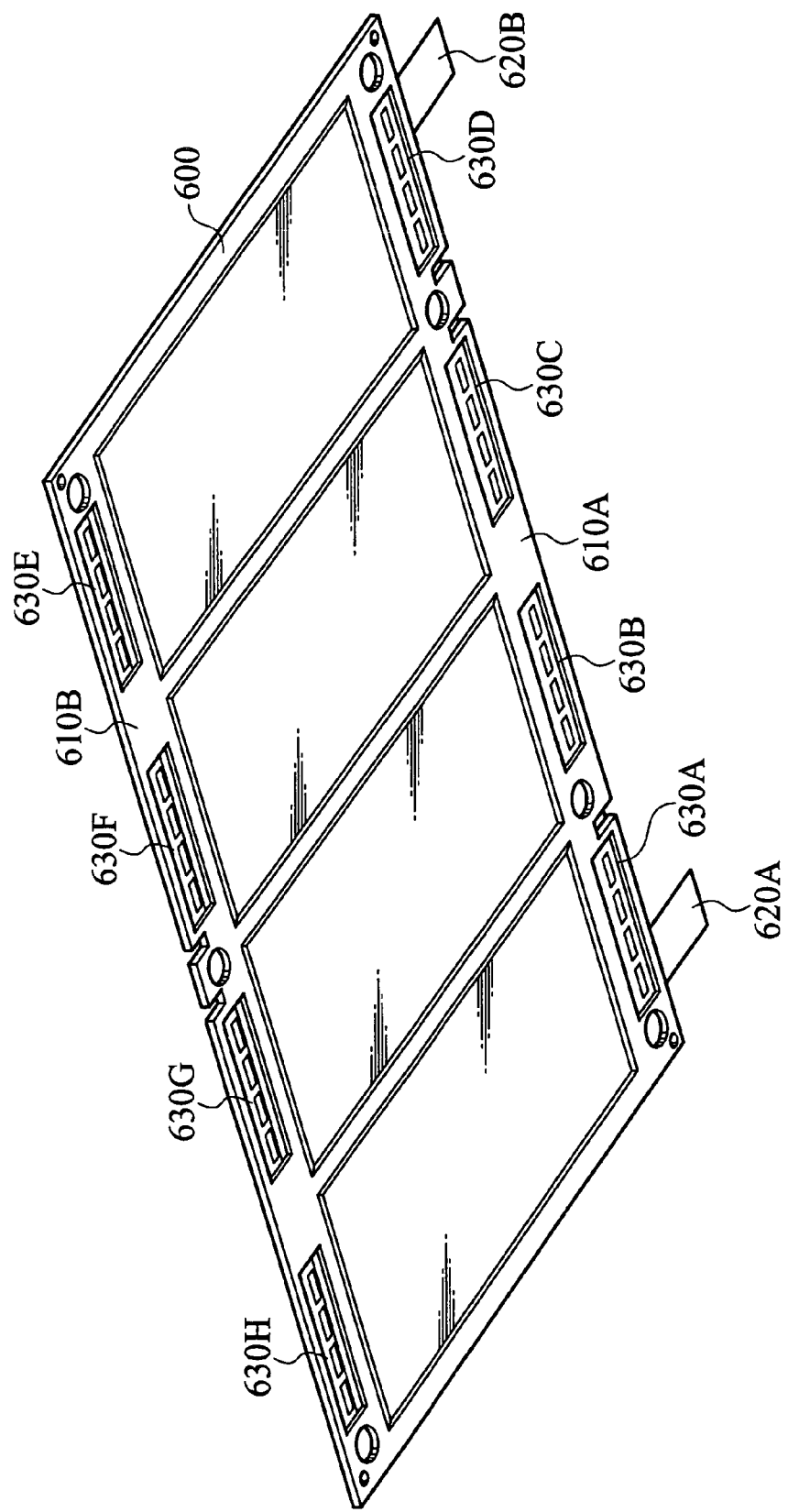
FIG. 25 is a diagram showing a tool insertion opening that is formed on the frame.

As shown in FIG. 24, electrode tabs 605A, 605B, 606A, 606B, 607A, 607B, 608A, and 608B of the unit cells 605 to 608 mounted on the frame 600 are ultrasonically welded with the bus bars 620A to 620E to which the electrode tabs are connected respectively. FIG. 25 is a diagram of the frame 600 in FIG. 24 as seen from the direction of an arrow mark B (i.e., from the bottom). Insertion openings 630A to 630H for tools that connect the bus bars with the electrode tabs by ultrasonic welding are provided at the other end of the one end 610A and the other end of the frame. The tools of the ultrasonic welder are inserted into these insertion openings, and the electrode tabs are ultrasonically oscillated to connect the electrode tabs with the bus bars.

Twenty-four frames to which the unit cells are connected as described above are laminated on the heat sink 350 to form a battery in a similar manner to that according to the first embodiment. In laminating the frames, the polarities of the unit cells need to be set alternately in the lamination direction of the frames as well. For example, when the unit cells mounted on the frame in the bottom layer have polarities in the order of positive, negative, positive, and negative from the left side at the bottom of FIG. 23, the unit cells mounted on the frame laminated on this frame must have polarities in the order of negative, positive, negative, and positive from the left side at the bottom.

Figure 26:
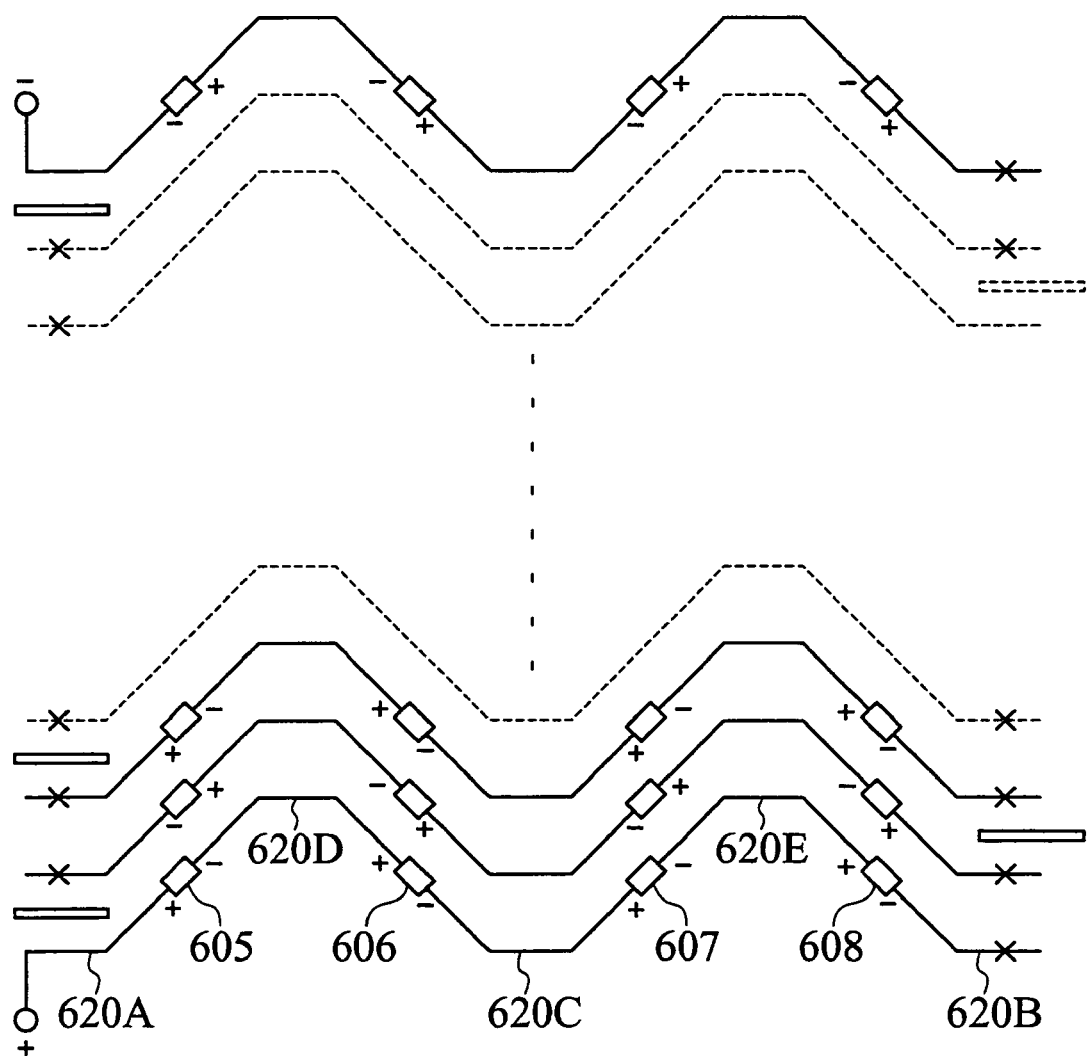
FIG. 26 is a schematic diagram showing a state of a connection between unit cells when the frames shown in FIG. 24 are laminated to constitute a battery

Based on the above layout, the positive/negative polarities of the L-shaped bus bars of each frame are also arranged alternately in the lamination direction of the frames. Therefore, when the bus bare adjacently arranged in the lamination direction are connected together with of an insulation material interposed at every second bus bar, all the laminated unit cells can be connected in series as shown in FIG. 26. In the present embodiment, the intermediate heat sink is also interposed at every sixth frame in the lamination direction.

In FIG. 26, a circuit in the bottom layer is formed by the frame 600 shown in FIG. 23. As shown in FIG. 26, the unit cells 605 to 608 arranged in the same frame are connected in series using the bus bars 620A to 620B. Another frame is laminated on this frame 600. me bus bar positioned on the bus bar 620B (i.e., a portion of a ? mark as depicted in FIG. 26) is ultrasonically welded in the state that these frames are laminated. An insulation tape(i.e., a portion of a square mark as depicted in FIG. 26) is adhered to the upper side of the bus bar 620A to prevent the bus bar 620A from being brought into contact with the bus bar positioned on the bus bar 620A. As shown in the drawing, twenty-four frames are laminated. One bus bar adjacently arranged in the lamination direction is ultrasonically welded, and the other bus bar is insulated. This arrangement provides a series circuit having ninety-six unit cells connected in series.

According to the present embodiment, while the bus bars are connected together by ultrasonic welding, the bus bars can be connected using bolt nuts. As the bolt nuts are used for the connection, it is preferable to use an oscillation stopper to prevent from causing oscillation of bus bar due to the weight of the bolt nut.

Third Embodiment

According to a third embodiment, the battery is formed using a frame on which only one unit cell can be mounted, unlike the batteries according to the first and the second embodiments. According to the third embodiment, frames, on each of which one unit cell is mounted, are laminated to form a laminated structure of unit cell. A plurality of the laminated structures of unit cell is disposed on one plane to form a battery.

Figure 27:
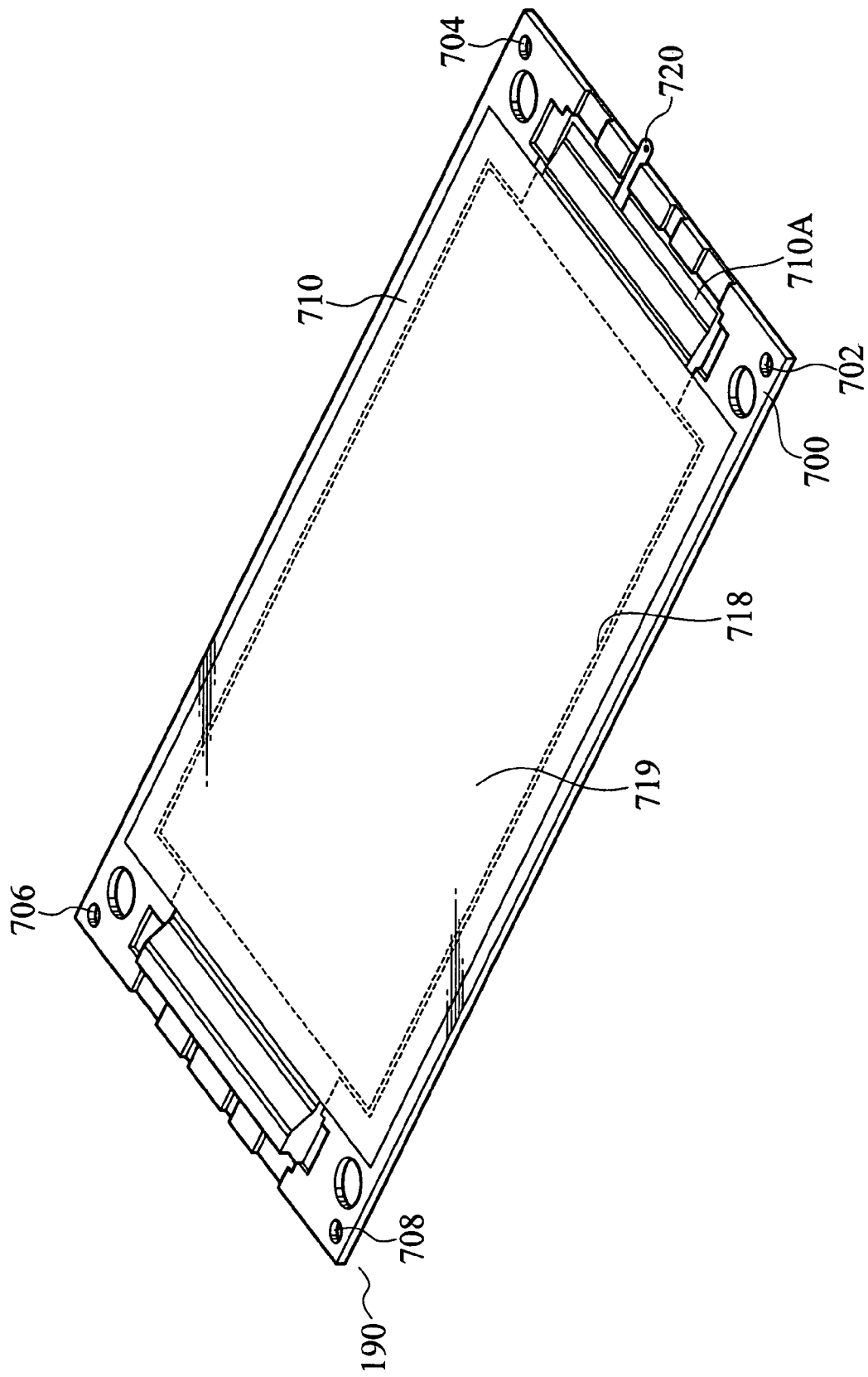
FIG. 27 is a configurational diagram of a frame that is used in a third embodiment.

FIG. 27 is a configurational diagram of a frame 700 used in the present embodiment. The configuration of the frame 700 is substantially the same as that of the portion of the frame on which one unit cell is mounted according to the first embodiment. In other words, the frame 700 has a holder 719 that holds one unit cell. The holder has a peripheral supporter 718 that holds at least a part of the periphery of the unit cell, and a positioner that positions the unit cell. The positioner is a portion formed around the peripheral supporter to position the peripheral end of the unit cell.

Locate pin through holes 702, 704, 706, and 708 to pass through frame positioning locate pins are provided at four corners of the frame 700. A voltage detecting terminal 720 is fitted to the frame 700 by insert molding. When a unit call 710 is mounted on the frame 700, one electrode tab 710A of the unit cell 710 is brought into contact with the voltage detecting terminal 720.

Figure 28:
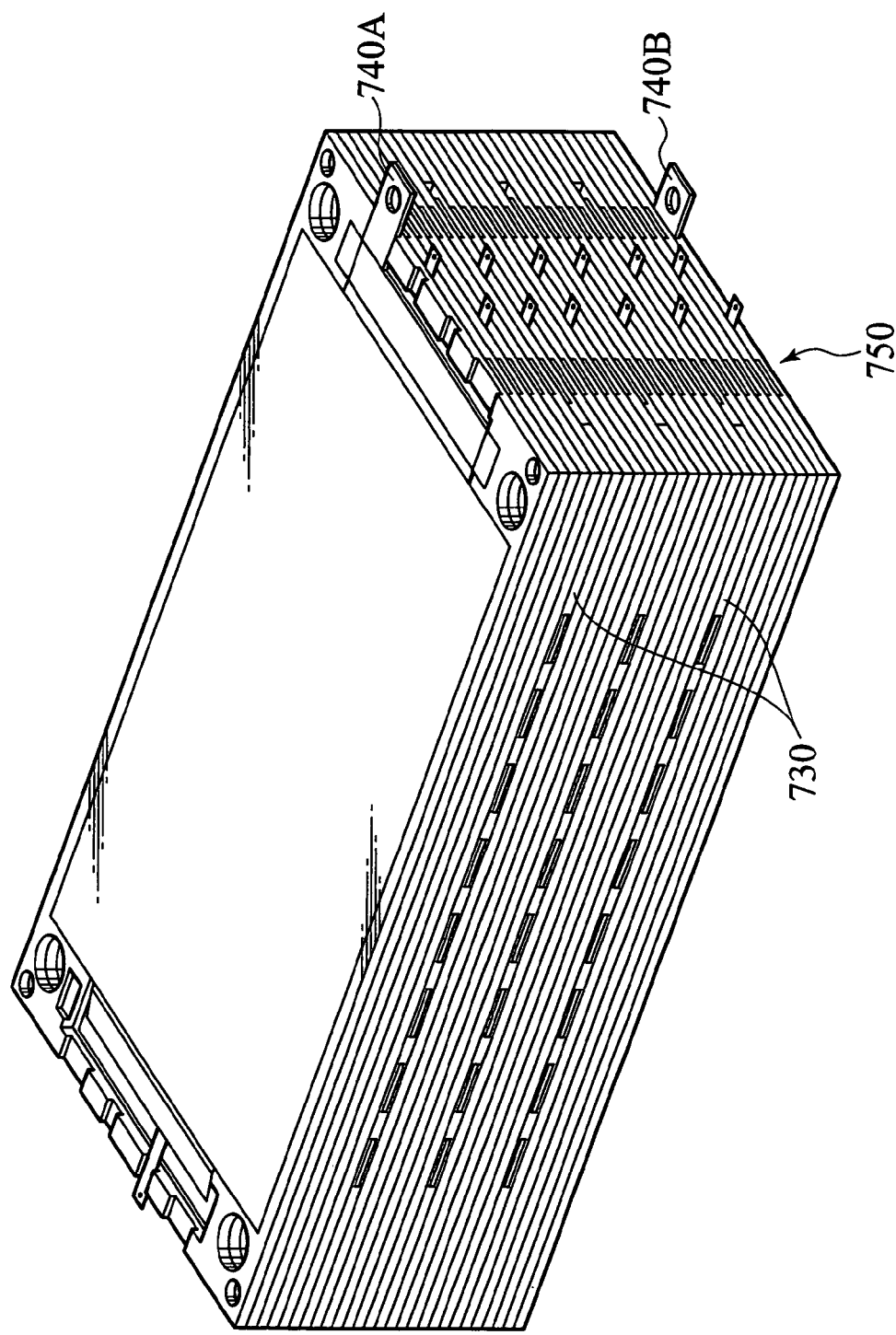
FIG. 28 is a perspective diagram of a lamination structure of unit cells constituted by laminating the frames shown in FIG. 27.

Twenty-four frames 700 are laminated, with an intermediate heat sink 730 interposed at every sixth frame, to form a laminated structure of unit cell 750, as shown in FIG. 28. All the unit cells that constitute the laminated structure 750 are electrically connected in series, like the laminated structure 400 as shown in FIG. 5. According to the present embodiment, electrode tabs are connected to each other by ultrasonic welding. The frames being positioned in the bottom layer and the top layer of the laminated structure are fitted with bus bars 740A and 740B, respectively.

Figure 29:
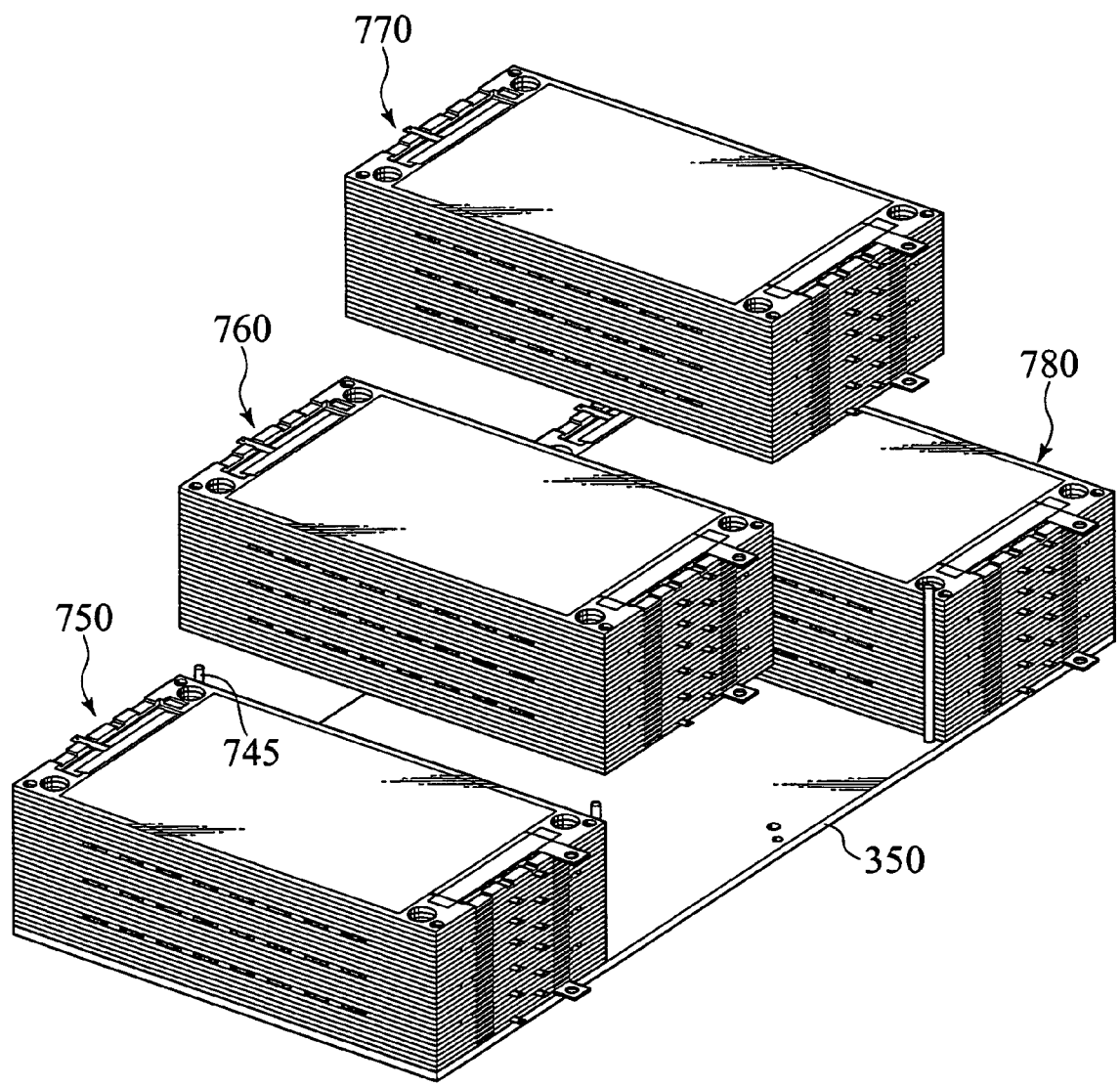
FIG. 29 is a perspective diagram of a battery comprises a lamination structure of the unit cells as shown in FIG. 28.

Four laminated structures manufactured in the above method are arrayed on the same plane of the heat sink 350 as shown in FIG. 29. Sixteen locate pins 745 are erected on the heat sink 350 to position laminated structures 750, 760, 770, and 780 (i.e., four locate pins are erected for each laminated structure). The locate pins are inserted into corresponding locate pin through holes of the unit cell laminations 750, 760, 770, and 780. All the laminated structures 750, 760, 770, and 780 are mounted on the heat sink 350 in this way. Although not shown, bus bars of each laminated structure are electrically connected by a connector so that the four laminated structures are connected in series. After the laminated structures 750, 760, 770, and 780 are mounted on the heat sink 350, the heat sink 300 as shown in FIG. 1 is mounted last. As a result, the battery having the same appearance as that of the battery 100 in FIG. 1 is formed.

As explained in the first to the third embodiments of the present invention, the battery has a laminated structure of unit cell without substantially providing a clearance between the unit cells. Intermediate heat sinks are interposed by a number corresponding to the necessary heat dissipation amount, thereby applying a surface pressure suitable for each unit cell. Therefore, a compact cell with a high energy density for an automobile can be constituted. As the battery has a solid structure without a clearance, the cell has high rigidity with excellent oscillation resistance. The battery can be assembled by simply laminating frame units and fastening the frame units with bolts. Therefore, the assembly work is efficient.

The battery according to the present invention has excellent oscillation resistance and heat dissipation, with light weight in a compact structure. Therefore, the battery can be used for a power source of a robot that works in a field of poor working conditions and a power source for a construction site, not only for the cell for an automobile.

According to the method of manufacturing the battery of the present invention, a cell module is formed first, and a laminated structure of unit cells is formed next. Therefore, the work role of each production process becomes clear. As a result, the battery of high reliability can be manufactured efficiently.

This application claims benefit of priority under 35USC §119 to Japanese Patent Applications No. 2003-351710, filed on Oct. 10, 2003, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A battery comprising:
a plurality of cell modules, wherein the cell modules are joined to each other, each of the cell modules having a plurality of flat unit cells, wherein each flat unit cell has a power generation element and a film as an exterior material for the power generation element, wherein electrode tabs are drawn out from the exterior material; and
plate frames each having holders, each holder having a center portion surrounded by a peripheral supporter, the center portion defining a bottom side and a top side that are open,
wherein each holder holds one of the flat unit cells within each cell module such that the flat unit cells within each module are arrayed on a virtual plane as defined by a plate frame,
wherein the plate frames are laminated in a direction intersecting the virtual plane; and
wherein an external surface of each given flat unit cell is brought into direct contact with an external surface of an adjacent flat unit cell adjacent to the given flat unit cell in the lamination direction.

2. A battery according to claim 1, wherein the flat unit cells are not electrically connected to each other within each cell module; and
wherein each flat unit cell is electrically connected to a corresponding flat unit cell included by an adjacent cell module.

3. A battery according to claim 1, wherein each plate frame holds its respective plurality of flat unit cells, and
wherein the plate frames are laminated to form a laminated structure.

4. A battery according to claim 1, further comprising pressurizing holders each of which integrally holds the unit cells by pressurizing the unit cells.

5. A battery according to claim 3, wherein the peripheral supporter of each holder supports a part of a periphery of its respective flat unit cell and positions the flat unit cell therein.

6. A battery according to claim 1, wherein the peripheral supporter of each holder supports a part of a periphery of its respective flat unit cell and positions its respective flat unit cell.

7. A battery according to claim 3, wherein each plate frame has a first connector that electrically connects one electrode tab of one of its respective plurality of flat unit cells being held in the plate frame to one electrode tab of an adjacent flat unit cell being held in another plate frame adjacent thereto in the lamination direction.

8. A battery according to claim 1, wherein each plate frame has a first connector that electrically connects one electrode tab of one of its respective plurality of flat unit cells being held in the plate frame to one electrode tab of an adjacent flat unit cell being held in another plate frame adjacent thereto in the lamination direction.

9. A battery according to claim 1, wherein each plate frame has a second connector that electrically connects one electrode tab of one of its respective plurality of flat unit cells being held in the plate frame to one electrode tab of an adjacent flat unit cell being held in the same plate frame.

10. A battery according to claim 3, wherein each plate frame has a voltage detecting terminal that detects a voltage of a given flat unit cell being held in the plate frame and that is electrically connected to one of the electrode tabs of the given flat unit cell.

11. A battery according to claim 1, wherein each plate frame has a voltage detecting terminal that detects a voltage of a given flat unit cell being held in the frame and that is electrically connected to one of the electrode tabs of the given flat unit cell.

12. A battery according to claim 4, wherein the pressurizing holders function as a pressurizing unit that applies a surface pressure in the lamination direction to all the flat unit cells, and function as a cooler that cools the battery by dissipating heat generated from the unit cells.

13. A battery according to claim 4, wherein the pressurizing holders have a third connector that electrically connects one laminated structure of cell modules to another laminated structure of cell modules.

14. A battery according to claim 1, wherein at least one cooler is interposed between the laminated plate frames.

15. A battery according to claim 1, wherein the flat unit cells are held in plate frames such that polarities of the electrode tabs of the flat unit cells are alternately arranged in the lamination direction.

16. A battery according to claim 1, wherein the flat unit cells laid out in one given plate frame are held in the given plate frame such that polarities of the electrode tabs of the flat unit cells within the given plate frame are alternately arranged in a layout direction.

17. A battery according to claim 1, wherein the power generation element of each flat unit cell has positive electrode plates and negative electrode plates laminated inside in order; and wherein the flat unit cells are laminated in the same direction as the lamination direction of the positive electrode plates and the negative electrode plates of the power generation element.

18. A battery according to claim 1, wherein all the flat unit cells are electrically connected in series.

* * * * *